United States Patent [19]

Swallow

[11] 3,944,997
[45] Mar. 16, 1976

[54] IMAGE GENERATOR FOR A MULTITERMINAL GRAPHIC DISPLAY SYSTEM

[75] Inventor: Ronald J. Swallow, Upper Marlboro, Md.

[73] Assignee: Research Corporation, New York, N.Y.

[22] Filed: May 22, 1974

[21] Appl. No.: 472,176

Related U.S. Application Data

[63] Continuation-in-part of Ser. No. 462,171, April 18, 1974.

[52] U.S. Cl. .................. 340/324 AD; 178/DIG. 6
[51] Int. Cl.² ......................................... G06F 3/14
[58] Field of Search ................ 340/324 A, 324 AD; 178/DIG. 6

[56] References Cited
UNITED STATES PATENTS 3,778,811  12/1973  Gicca et al. .................. 340/324 AD

*Primary Examiner*—Marshall M. Curtis
*Attorney, Agent, or Firm*—Cooper, Dunham, Clark, Griffin & Moran

[57] ABSTRACT

An image generator including a visible edge encoder which receives information defining the visible surfaces of a two-dimensional projection of a three-dimensional world and provides encoded two-dimensional visible edges which are x-ordered and are ready for transmission to a plurality of display terminals. The information received by the visible edge encoder defines the x and y intercepts, in successive planes which include the observer's eye and successive scanlines, of all three-dimensional edges which would be visible to the observer. The information provided by the visible edge encoder is edges which represent a two-dimensional projection of three-dimensional objects, each edge defined by its intended position on a two-dimensional screen and by attributes for a portion of the screen adjacent the edge, such as color, brightness, shading and the like. The edges which are provided by the visible edge encoder and are transmitted to the display terminals, where they are decoded into video raster points, are a highly compressed representation of a video raster; hence, the communication link between the image generator and the terminals can have a relatively low capacity, and the same image generator can service a substantial number of display terminals.

8 Claims, 32 Drawing Figures

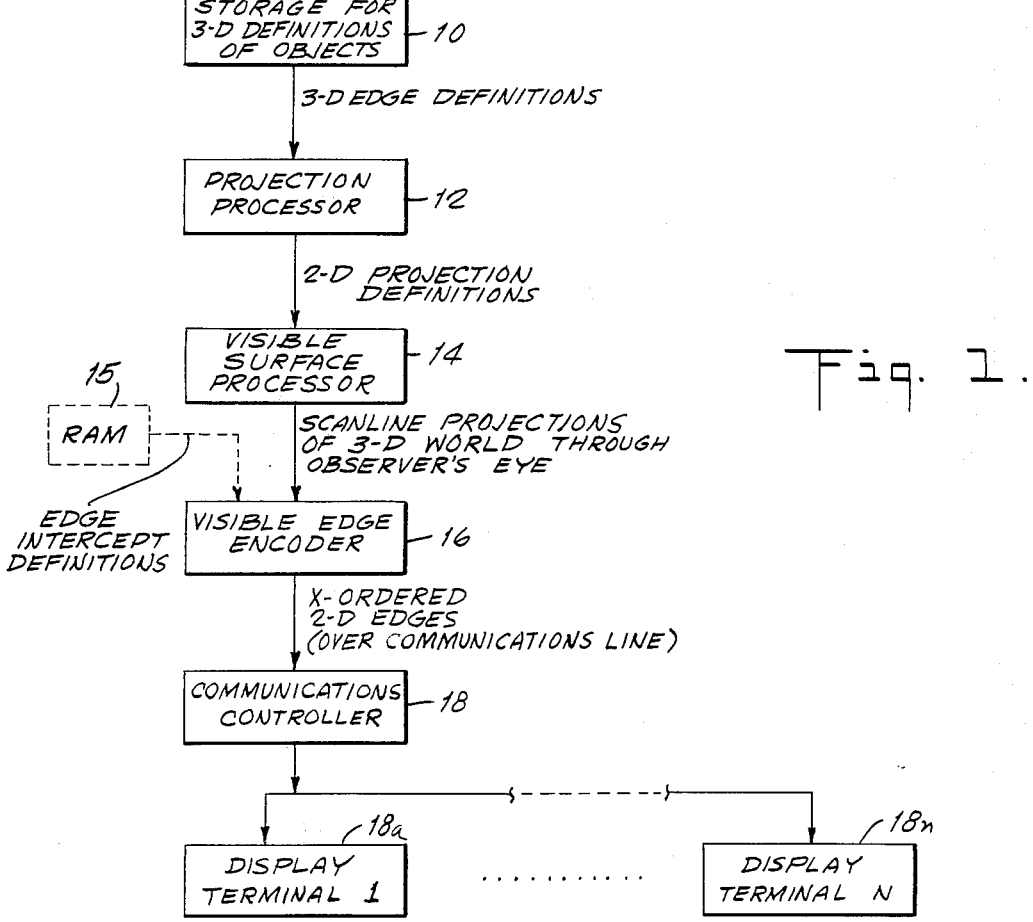
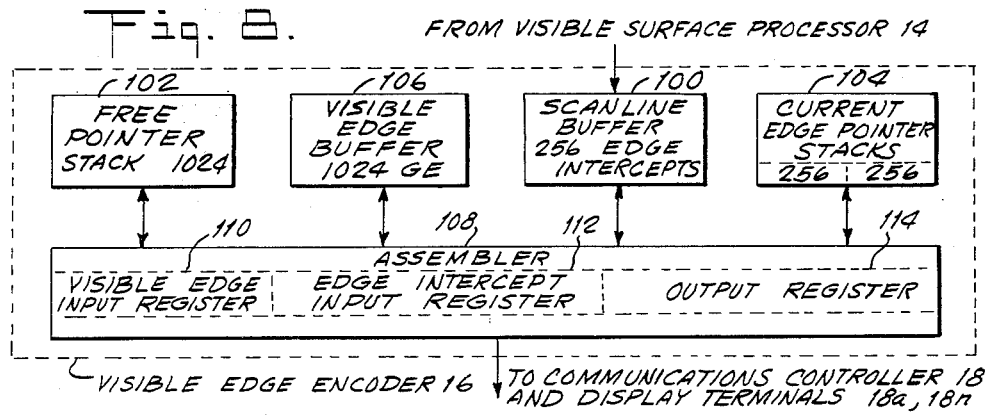

Fig. 3.
EDGE INTERCEPT DEFINITION $x$ COORDINATE OF EDGE INTERCEPT
SLOPE OF EDGE CAUSING THE INTERCEPT (2-D SLOPE)
BRIGHTNESS AT TOP OF EDGE (AT $y$-MIN. OF EDGE)
COLOR TO THE RIGHT OF EDGE
FLAGS DENOTING SHADING AT LEFT AND RIGHT OF EDGE
TAG OF SURFACE TO THE RIGHT OF EDGE
TAG OF SURFACE TO THE LEFT OF EDGE (WHICH MAY FACE TO THE REAR)
TAG FOR RIGHT SURFACE (WHICH MAY FACE TO REAR)
1 IF THIS IS THE TOP OF A 3-D EDGE, 0 IF NOT
1 IF THIS IS THE BOTTOM OF A 3-D EDGE, 0 IF NOT $x, S, B^t, C \quad T(Fl, Fr), Slast, Sl, Sr, nf, lf$

Fig. 5.

$x$-COORDINATE AT TOP OF EDGE
$y$-COORDINATE AT TOP OF EDGE
HEIGHT OF EDGE
SLOPE OF EDGE
BRIGHTNESS AT TOP OF EDGE
COLOR TO RIGHT OF EDGE
GRADIENT OF BRIGHTNESS DOWNWARD ALONG EDGE
LINEAR BRIGHTNESS VARIATION FLAG
FLAG FOR 1st EDGE OF A SET

EDGE → | X | Y | H | S | B | C | G | F | E |

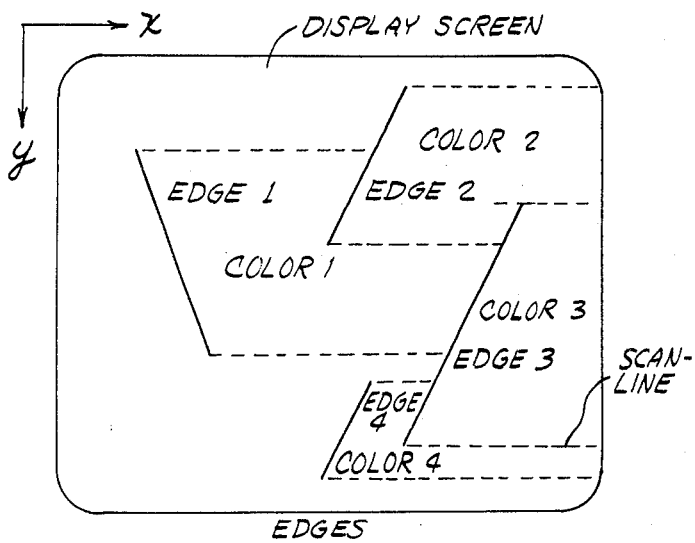

Fig. 6.

← X FOR IMAGE GENERATOR
→ X FOR DISPLAY TERMINAL

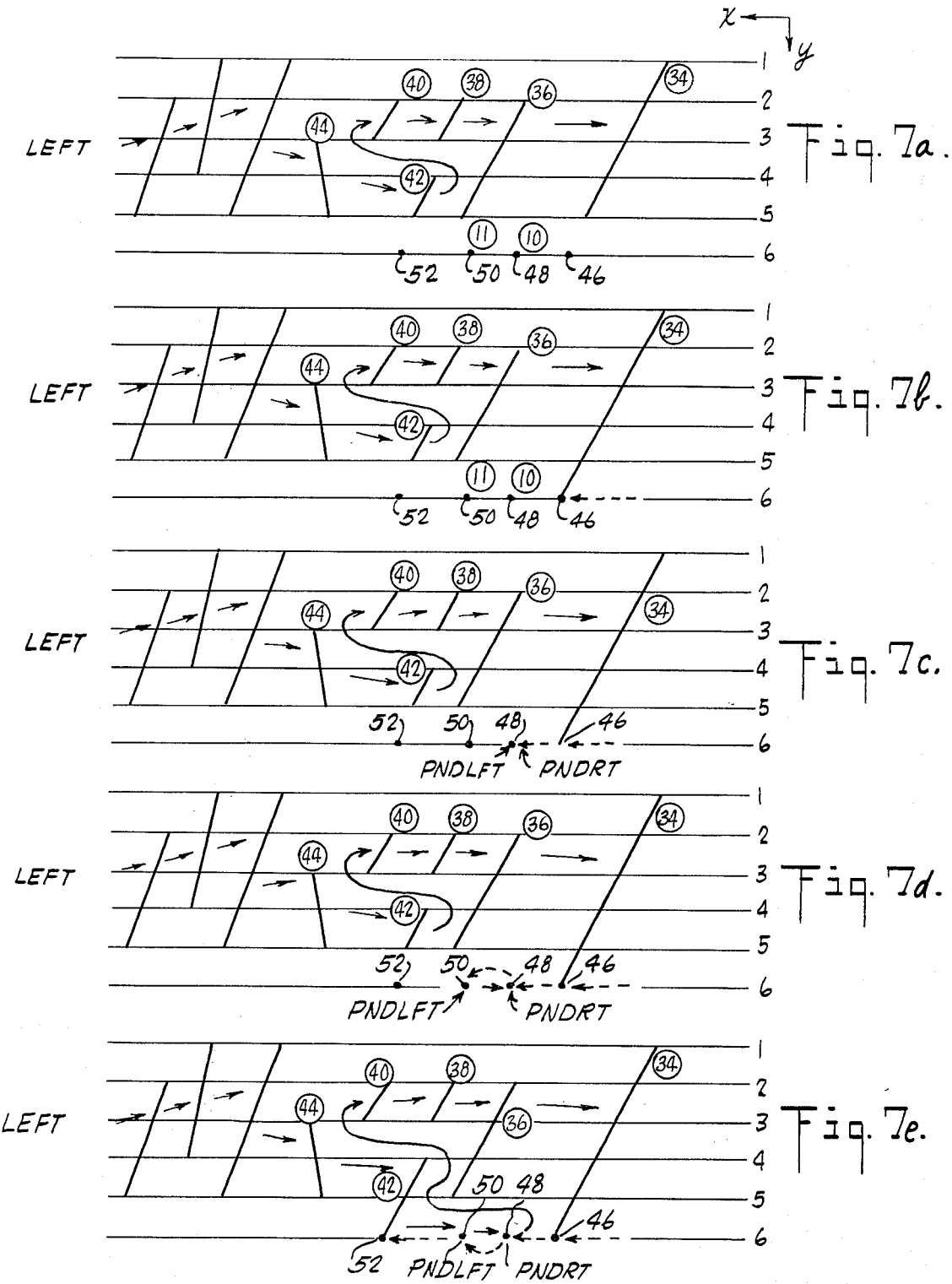

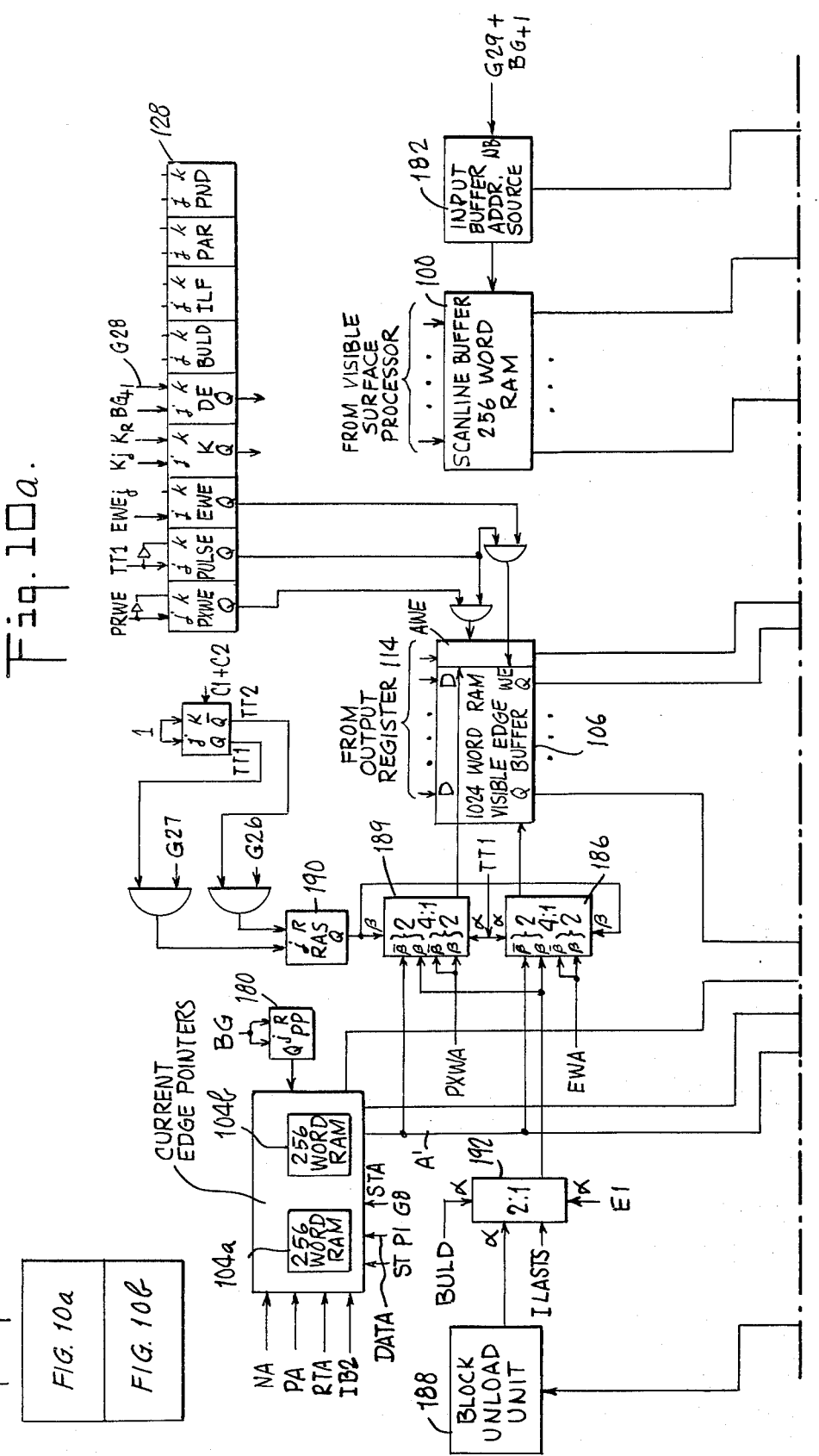

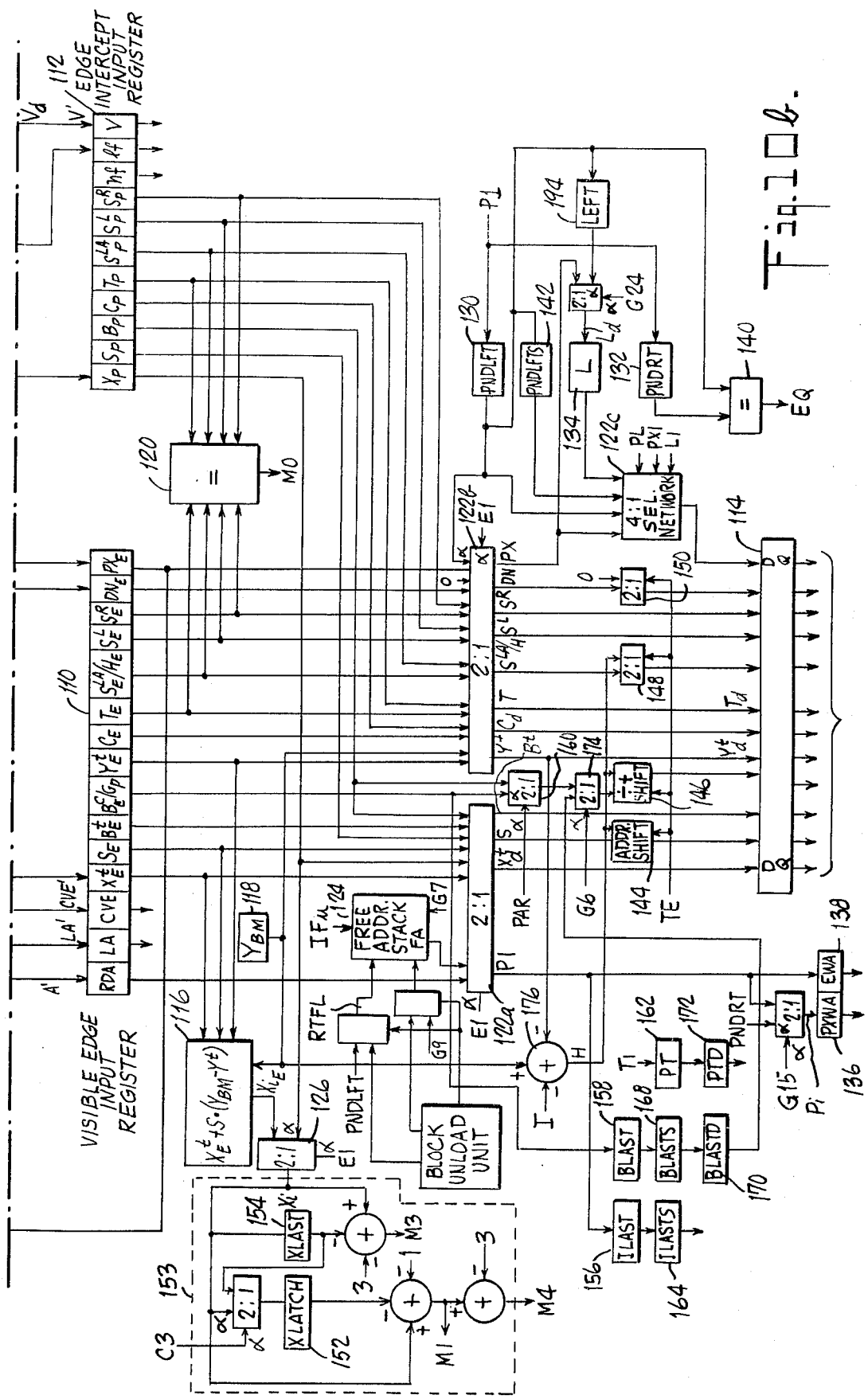

Fig. 9. VISIBLE EDGE DEFINITION IN VISIBLE EDGE ENCODER 16

$X^t$, $S$, $Y^t$, $B^t$, $B^o$(OR G), C, T, Slast (OR H), Sℓ, Sr, DN, PX

CURRENT BRIGHTNESS OR GRADIENT

1 FOR A TERMINATED EDGE, 0 OTHERWISE X-ORDER POINTER

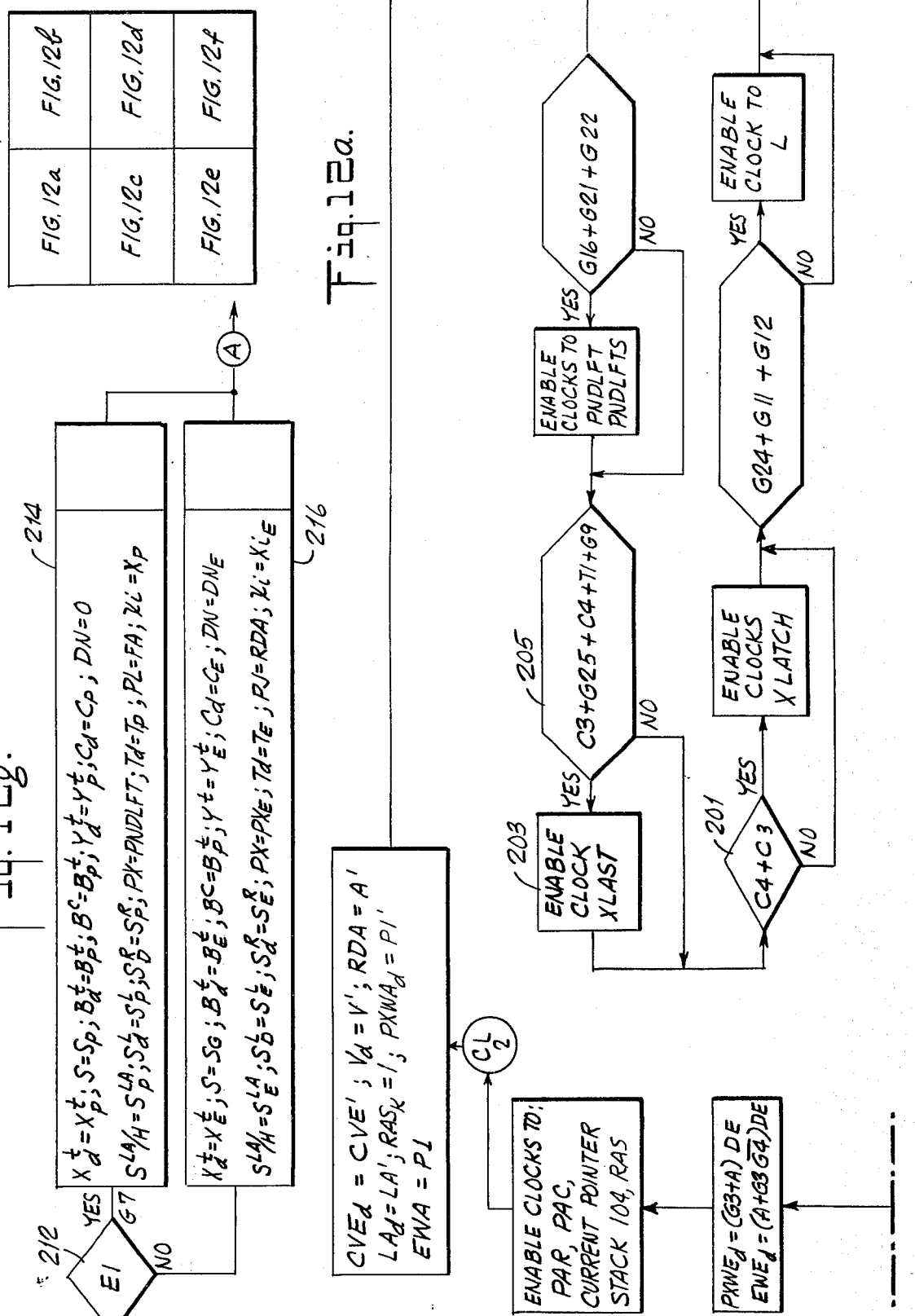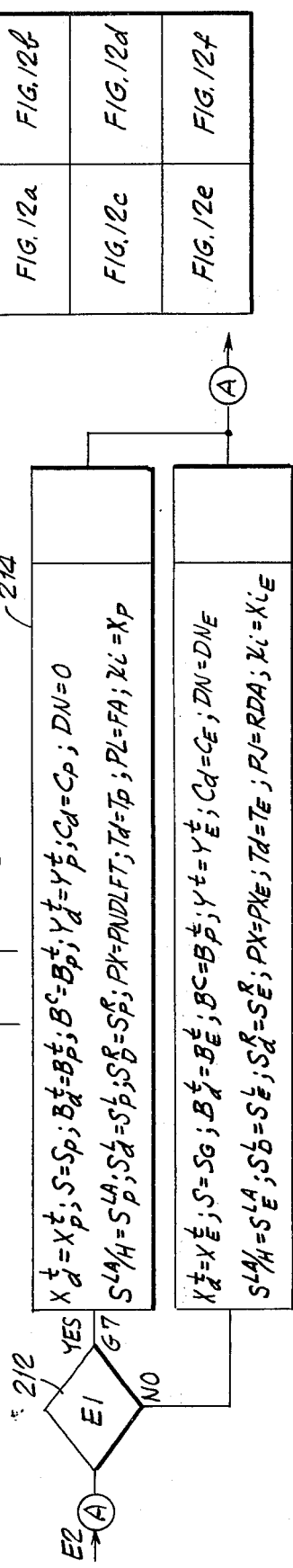

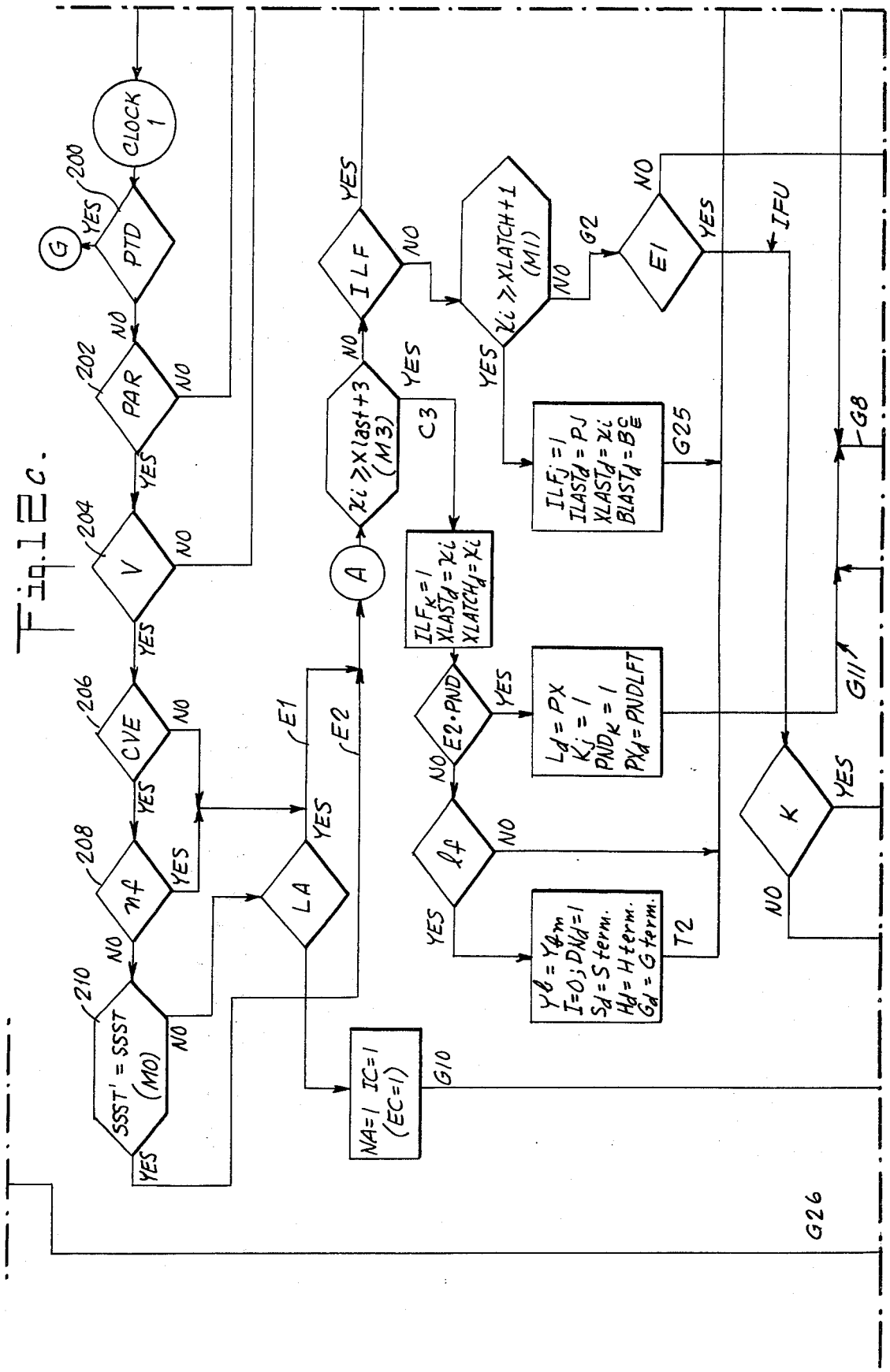

IMAGE GENERATOR FOR A MULTITERMINAL GRAPHIC DISPLAY SYSTEM

This is a continuation-in-part of U.S. patent application Ser. No. 462,171 filed on Apr. 18, 1974, which is hereby incorporated by reference.

BACKGROUND OF THE INVENTION

The invention is in the field of computer graphics and relates specifically to an image generator servicing a plurality of display terminals.

In computer graphics, a representation of a generally three-dimensional world is stored in a memory, and selected two-dimensional projections of selected portions of it are displayed on a two-dimensional display surface such as a television screen. The stored information and the display surface may take a variety of forms. A simple example of a system of this type is a video tape serving as a memory and storing a selected set of two-dimensional views of a three-dimensional world, combined with a television set. A more complex example is a specifically programmed digital computer system which stores a three-dimensional object such as a cube by identifying the coordinates of its edges, generates selected two-dimensional projections of the three-dimensional object and the coordinates of the lines making up this projection, and either transmits the coordinates of the lines making up the projection to a stroke type display device or converts the line coordinates to a set of raster points and transmits that set to a raster display device such as a television receiver.

A survey of computer graphic techniques may be found in Sutherland, I. E., A Characterization of Ten Hidden Surface Algorithms, ACM Computing Surveys, Vol. 6, No. 1, March 1974, pages 1–55; and in the references listed at page 45 of the article, and particularly in Newman, W. M. et al., Principles of Interactive Computer Graphics, McGraw-Hill, 1973. The references discussed in this paragraph are hereby incorporated by reference in this disclosure.

A major factor which has prevented widespread use of computer graphics has been the cost of storing great amounts of information and of transmitting information to the display devices at a high rate. For example, if the purposee of a system is to show on a display surface any selected view of a three-dimensional object such as a cube, it is theoretically possible to store a nearly infinite number of views on a video tape and to find and display a selected one on a television screen, but this would be prohibitively expensive. A great reduction in the amount of stored information results when a three-dimensional object is stored in computer memory not as it looks in a specific two-dimensional view but as it actually is in three dimensions, e.g., by storing the three-dimensional coordinates of the apices or the edges of a cube. This three-dimensional information can be computer processed to generate almost any perspective view of the three-dimensional object, to thus reduce storage cost as compared to a video tape storage. The remaining question is then how to transmit a representation of the two-dimensional view of the object to a display device and how to display it. The answer to this question must take into account and reconcile a number of conflicting factors, such as: the desirability of a low transmission rate so as to avoid expensive communication links between the central computer and the display device, the desirability of fast operation of the display device so as to be able to show a complex image without flicker and the desirability of having minimal storage at the display device so as to minimize cost.

In various approaches to reconciling these conflicting factors, some prior art systems use stroke-type display devices (IBM 2250 and Tectronics) which form lines by random positioning and stroking of the CRT beam, others use video gating over a TV raster (Anagraph) and still others use random point plotting (Plasma). All these types of display devices refresh the display either by repeated image generation from encoded form such as lines (IBM 2250), be reading a video storage device such as a video disc (Anagraph) or shift register memory (TICCIT), by reading a storage tube (Tectronics) or by use of a special memory display panel (Plasma).

While the stroke type display devices afford relatively low transmission rate between the image generator and the display device, since line identification data is transmitted and not video raster, these devices can not display complex images because of limited stroking rates. While the other types of display devices discussed immediately above can theoretically display complex images, they are severely limited in resolution because of the high cost of locally storing each point of an image and because of the required high transmission rate.

There are only two systems known to applicant which use point display devices and are capable of displaying area graphics where arbitrary shapes or surfaces can be simulated: the system developed by the Evans and Sutherland Computer Corporation and the system developed By G.E. for pilot simulator-like application. Both are systems in which the terminal display device includes a special purpose image generator computer. Both systems generate colored perspective views from three-dimensional descriptions of objects, but both are limited to one display device since the output of the image generator is a color video raster to a color monitor. Modification of these two systems by the use of a blackboard memory in the display monitor, in order to share the image generator for several users, is uneconomical because of the high cost of buffering colored video raster data. Additionally, both of these two systems are limited in speed, only one picture per 1/30th second being possible.

A need remained therefore for a graphics display system using a relatively low transmission rate between the image generator and the display terminals, capable of supporting a number of display terminals by the same image generator, needing minimal storage of data at the display terminal and capable of producing flickerless display of complex images, all this at a relatively low price per terminal. This need is met by the display terminal system disclosed in the patent application of which this is a CIP. The remaining need, prior to this invention, was to have an image generator which can start with a representation of a three-dimensional world, and provide x-ordered two-dimensional edges which are relatively inexpensive to transmit and which are of the type usable by said display terminal system, and to provide such edges at a sufficiently high rate for flickerless display of different, complex images at a high number of display terminals.

SUMMARY OF THE INVENTION

The invention is in the field of sophisticated graphic display systems, and is particularly directed to a visible edge encoder and to its combination with display terminals. The main object of the invention is to process visible edge information such that a single image generator can service, at a relatively low cost, a great number of display terminals each displaying relatively complex images without flicker.

In a specific embodiment of the invention, the visible edge encoder receives a succession of intercepts of visible edges with successive planes each including a selected position for an observer and for a scanline. The edge intercept definitions include information such as the position of the intercept, an identification of the three-dimensional surface or surfaces whose intersection formed the edge that intersects the plane of the scanline, the brightness of that edge at the scanline, color of a portion of the scanline associated with that edge, whether the surfaces on the two sides of the edge are curved or flat, the slope of the edge, whether the edge projection represents the joining of two contiguous surfaces or not and whether the intercept is at the beginning or at the end of the three-dimensional edge producing it. In accordance with the invention, the visible edge encoder processes this information to form two-dimensional visible edges which are x-ordered in a single strand chain and which are ready for transmission to a communications controller distributing the transmitted edges to a number of display terminals. Each two-dimensional edge is defined by information such as the position of its top on a two-dimensional display screen, its two-dimensional slope, the brightness at its top, a gradient of brightness, the color of a portion of the display screen associated with it, and the like. The x order in which the two-dimensional edges are provided by the visible edge encoder is that required by the display terminals described in detail in the referenced parent disclosure, and ensures relatively low transmission cost and the ability to drive a number of display terminals with the output of the same visible edge encoder, and hence the same image generator.

BRIEF DESCRIPTION OF THE DRAWINGS

FIG. 1 is a generalized block diagram of a graphic display system incorporating an improved visible edge encoder and display terminal in accordance with the invention.

FIG. 3 shows an edge intercept definition.

FIGS. 5 and 6 illustrate edge definitions of the type provided by the visible edge encoder.

FIGS. 7a through 7e illustrate edges and edge intercepts in various stages of their processing by the visible edge encoder.

FIG. 8 is a generalized block diagram of the invented edge encoder.

FIG. 9 shows a visible edge definition as it appears in the course of its being processed by the visible edge encoder.

DETAILED DESCRIPTION

Figure 2:
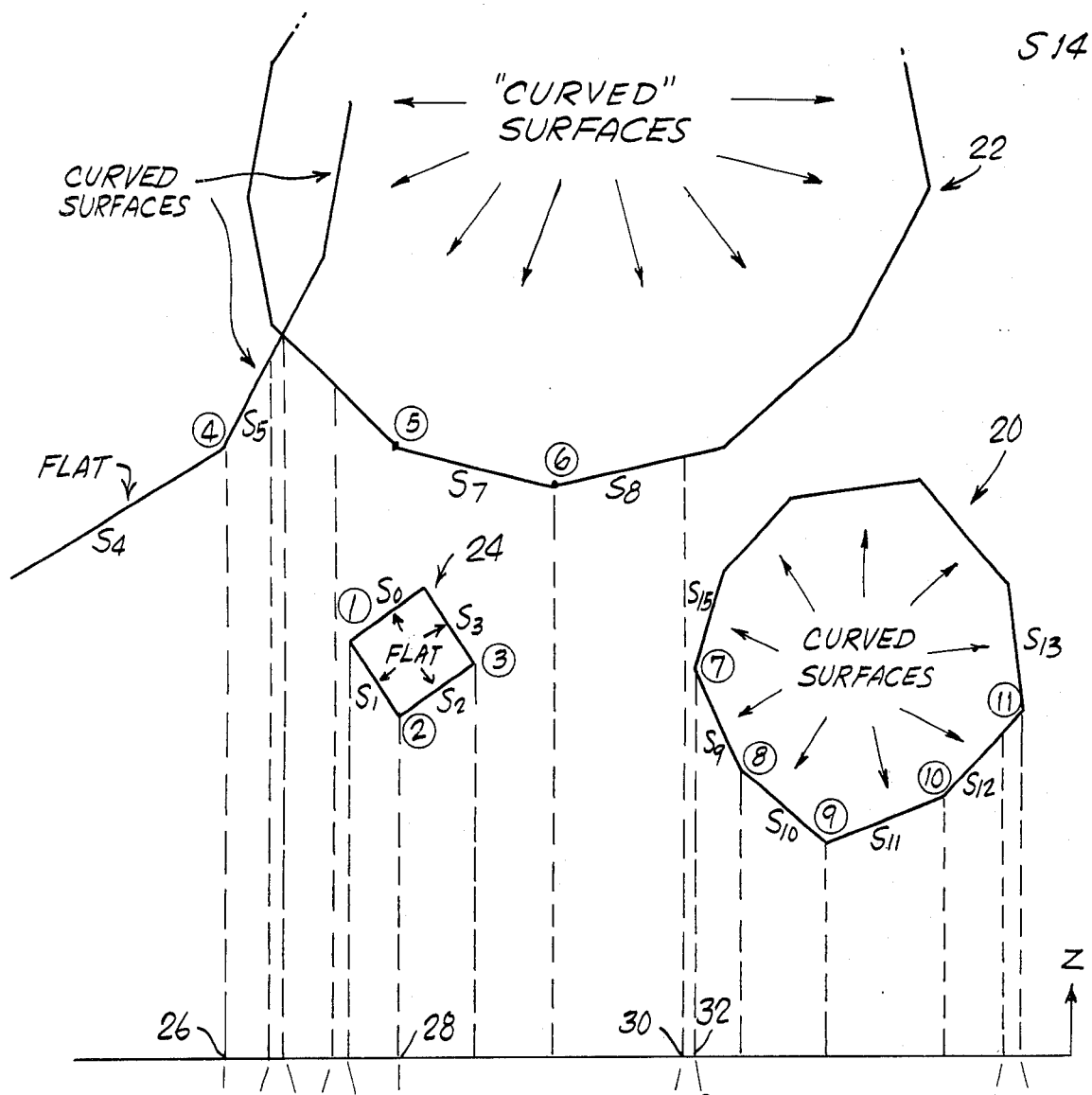
FIG. 2 illustrates the manner of deriving some of the information defining edge intercepts of visible edges.

Referring to FIG. 1, which shows a graphics display system of the type to which this invention is directed, a storage 10 stores 3-D definitions of objects, such as the coordinates of the apices or edges of 3-D objects, and provides these three-dimensional definitions to a projection processor 12 which combines these definitions with the definition of a selected projection to provide 2-D projection definitions to a visible surface processor 14 whose job is to find which surfaces would be visible to an observer located at a selected point within the three-dimensional world. The visible surface processor 14 looks at each of a number of planes, each plane including the observer's eye and a scanline, and finds which of the visible edges of the 2-D projection intersect that plane and where. For each intersection of a plane, the visible surface processor 14 provides the $x$ intercept and an identification of the visible edge causing the $x$ intercept. The output of the visible surface processor 14 is applied to a visible edge encoder 16, which processes this information in accordance with the invention to provide a set of $x$-ordered 2-D edges for transmission to a communications controller 18 and display terminals 18a through 18n of the type described in full detail in the above-identified parent specification.

The invention is directed to the visible edge encoder 16 and the combination thereof with the communication controller 18 and the display terminals 18a through 18n. The information received by the visible edge encoder 16 may be provided by suitably modified specially programmed digital computers of the type used in the Evans and Sutherland system or the G.E. system discussed above, but since the generation of this information is not a part of this invention, for the purposes of this invention it will be assumed that the information required by the visible edge encoder 16 is stored in a suitable storage device, such as a burst-readable RAM (random access memory) 15.

FIG. 2 illustrates the information provided to the visible edge encoder 16. FIG. 2 is in a plane which includes a scanline extending along $x$, the eye of the observer, and the polygons 20, 22 and 24 over the scanline. The lines labelled S1, S2, S3, ... are the intersections of the correspondingly labelled surfaces of three-dimensional objects with the plane of the figure, and the end points of these lines are projected onto the scanline as indicated by the dashed lines which are surface-switch projections toward the eye of the observer onto the window of a desired display surface. When object surfaces are defined in three dimensions (e.g. in the storage 10) each surface is tagged either as smooth or as flat. Smooth implies that the brightness over the surface is to be a linear interpolated brightness obtained from that at the corners of the surface (by linear interpolation in the perspective domain along the perimeter of the surface and in the $x$ direction of the perspective). Each surface switching along a scanline is tagged by its surface on the left ($sl$), its surface on the right ($sr$), and the surface visible on its right ($slast$). Note that $sl$ and $sr$ need not face the observer, e.g., for edge 3 in FIG. 2: $sl = S2$, $sr = S3$ and $slast = S7$. Whenever the left surface is curved (a flag F for that surface is set to O) but $slast$ is not on the same curved surface (i.e., when there is no 3-D edge defined by the intersection of these two surfaces), the surface switching is broken into two-edge intercepts, so that two visible edges are generated, and the surface between is given by the surface label of the left surface (*sl*). For example, referring to FIG. 2, because there is a discontinuity in brightness between the surfaces S8 and S9, another edge is generated to redefine the brightness further to the right of S8. Thus, the left of the pair of edge intercepts at the switching S8 to S9 is used to smooth-shade toward the right, and the right one of that pair is used to reset the brightness (possibly followed by a smooth shading to the right). Thus, for a discontinuous surface transition, as for S8 to S9, when a surface switching is either smooth-to-flat or smooth-to-smooth, two surface switchings are generated, separated by two units of resolution in the *x* direction, and the two unit separation surface is labelled as "flat". Each edge intercept is given a two-bit flag T, equal to F*l*/F*r* for its left/right surface type (flat-smooth, flat-flat, smooth-to-flat, and smooth-to-smooth). Thus, T for a smooth-to-smooth switching is 0, smooth-to-flat is 1, flat-to-smooth is 2, flat-to-flat is 3. Note that the switching represented by the two edges for surfaces S8 and S9 differ only in their two-bit flags T.

Still referring to FIG. 2, the polygons 20, 22 and 24 represent the intersection by the plane of the figure of three-dimensional objects extending transversely to the plane of the figure: S1, S2, S3 ... are the object surfaces which intersected with the plane of the drawing, and the circled numbers ①②③ ... are the edges formed where surfaces join in the perspective. Thus, object edge ② is the joining of surfaces S1 and S2, object edge ③ is the joining of the surfaces S2 and S3, object edge ⑨ is the joining of surfaces S10 and S11, etc. The projection on the shown scanline of the intersection between the plane of the drawing and edge 4 is the edge intercept at point 26, the projection on the scanline of the intersection between edge ② and the plane of the drawing is at point 28, etc. As discussed above, in certain cases a surface switching is broken into two edge intercepts: for example, the edge intercepts 30 and 32. Each of the edge intercepts is defined by a word comprising a plurality of parameters including the parameters listed in FIG. 2 for the respective edge intercepts.

FIG. 3 illustrates the parameters defining edge intercepts of the type shown in FIG. 2. For example, edge ④ in FIG. 2 would be defined by the *x*-coordinate of its intercept at 26, by its perspective 2D slope, by the brightness at its top, by the color on its right, by the T-flag 2 meaning flat-to-smooth, by slast equal to a label identifying surface S5, by S*r* equal to a label identifying surface S5 and by *sl* equal to a label identifying surface S4. Some of the pertinent parameters for the other intercepts of visible edges shown in FIG. 2 are indicated below the scanline in FIG. 2.

Figure 4:
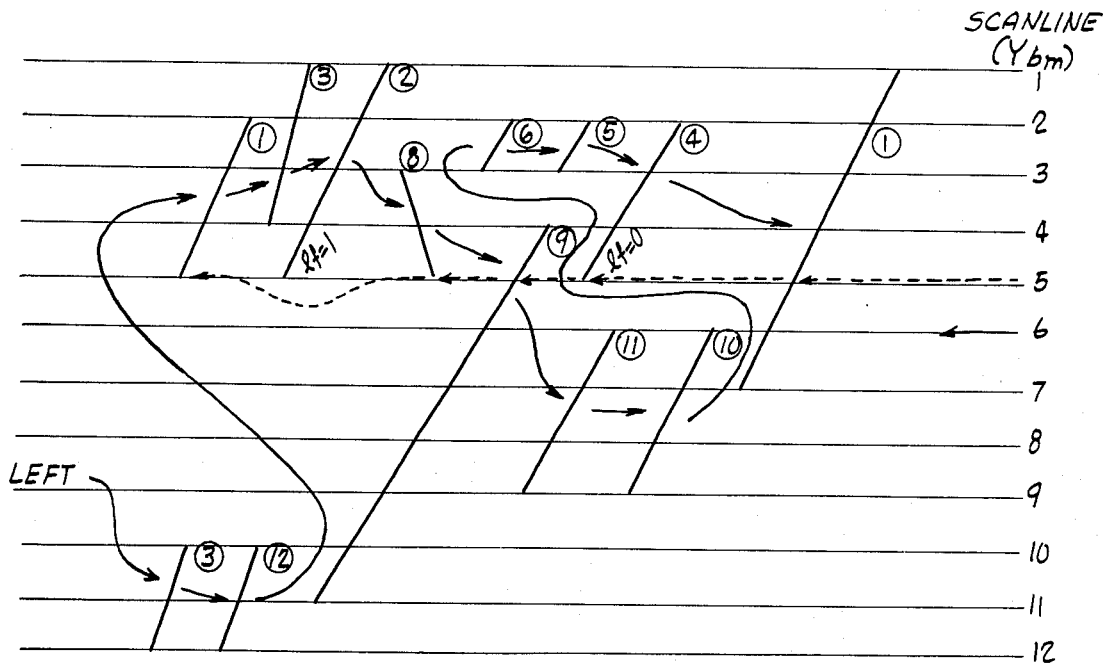
FIG. 4 illustrates a sequence of visible edges in the x order in which they are kept in the visible edge encoder.

Referring to FIG. 4, a two-dimensional projection of a three-dimensional world onto the plane of a selected viewing screen may appear as the 2-D edges ① through ⑬ (different from the edge intercepts 1, 2, 3, ... in FIG. 2). Each of the horizontal scanlines 1, 2, 3, ... corresponds to the single scanline in FIG. 2. Thus, for scanline 1 in FIG. 4, the point where edge ① intersects scanline 1 is defined by a word of the type shown in FIG. 3, and the same for the points where edges ② and ③ intersect scanline 1.

As stated earlier, since the manner in which edge intercept definitions are extracted does not form a part of this invention, it is assumed for the purposes of this disclosure that a suitable number of the above-described edge definitions (e.g. 256) are formed according to the rules defined above and are stored in a burst-readable RAM 15. The edge intercept definitions are stored in the RAM 15 one scanline at a time going from right to left in FIG. 4 and from the first toward the last (in number) scanline. In the example of FIG. 4: for scanline 1, the order of edge intercept definitions is ①, ②, and ③; for scanline 2, the edge intercept definition order is ①④⑤⑥②③ and ⑦, etc. The visible edge encoder 16 creates, in accordance with the invention 2-D visible edges in the order in which their first scanline intercepts appear. Thus, for the edges in FIG. 4, the edges are created in the visible edge encoder 16 in the order of their numbers, i.e., in the order ①②③④ etc. In contrast, the *x*-order for the edges transmitted to the terminals is shown by the solid arrows in FIG. 4, i.e., edges are ordered in a single strand and, as between edges which intersect the same scanline, the next right edge in the chain is that whose top x-coordinate is leftmost. In FIG. 4, edge ⑬ has the leftmost top *x*-coordinate, then when edge ⑨ is considered there are other edges to the left of it which intersect scanline 4 and 5, of which edge ⑦ has the leftmost *x*-coordinate, etc. The job of the visible edge encoder 16, in accordance with the invention, is to take in information of the type shown in FIG. 3, i.e., information defining the edge intercepts of scanlines going from right to left, and to construct from this information definitions of two-dimensional edges which are of the type used by the display terminals 18*a* through 18*n* and which are *x*-ordered as required by the display terminals.

Referring to FIGS. 5 and 6, each of the edges output from the visible edge encoder 16 to the display terminals has the form shown in FIG. 5 and the meaning illustrated in FIG. 6, as discussed in detail in the above-identified parent patent disclosure. Specifically, edge 1 in FIG. 6, which is similar to one of the edges shown in FIG. 4, is defined by a word of the type shown in FIG. 5, which defines its position on the display screen and attributes of the screen to the right of the edge by defining: the *x* and *y* coordinates to the top of the edge, the slope of the edge, the brightness at the top of the edge, the color to the right of the edge, the gradient of brightness downward along the edge, whether the brightness varies linearly or not, and whether it is the first edge of a set of edges transmitted from the visible edge encoder 16 to the display terminals 18*a* through 18*n*.

FIGS. 7*a* through 7*e* illustrate an example of a pointer system which is kept in the visible edge encoder 16 in accordance with the invention as edges are created and maintained in the required *x* order. Referring back to FIG. 4, the order in which edges are created from the edge intercept definitions is illustrated by the circled numerals, while the *x*-order in which the edges must be maintained is illustrated by the solid line arrows. Since the *x*-order information can be derived only by comparing the *x* intercepts of edges crossing the same scanlines, the *x*-order pointer system is generated and updated in accordance with the invention as the visible edges are generated, updated or terminated from the edge intercept information rather than at the end of the generation of the 2-D visible edges. At the beginning of a scanline, the visible edge encoder 16 contains in a suitable buffer two-dimensional edge definitions for those edges above that scanline (the buffer is empty at the first scanline). Using the scanline data for the current scanline, the visible edge encoder 16 does one of the following: extends if possible a previously created edge, or begins a new visible edge, or terminates an edge extended or unextended. Referring now to FIGS. 7a through 7e, FIG. 7a illustrates the beginning of scanline 6 and shows edges 34, 36, 38, 40, 42 and 44 defining a two-dimensional image for scanlines 1 through 5, and edge intercepts 46, 48, 50 and 52 of scanline 6. Note that this is the upper part of the edges in FIG. 2. The visible edge encoder 16 is not at the beginning of scanline 6. Referring to FIG. 7b, which shows the identical edge structure above scanline 6, a current edge pointer illustrated by the dash arrow points to edge intercept 46 is being prepared for use on the next scanline 7, and FIG. 7b shows that the edge intercept 46 has "matched" edge 34, and edge 34 has therefore been extended to scanline 6. Referring to FIG. 7c, edge intercept 48 does not match one of the existing edges, i.e., no existing edge can be extended to edge intercept 48. Edge intercept 48 is therefore the beginning of a new visible edge, and a pointer PNDLFT is set to point to the location of that new visible edge started at intercept 48. Since this new edge, starting at intercept 48, does not immediately follow another newly started edge, but rather follows the previously existing and extended edge 34, as in FIG. 7c, another pointer PNDRT is also set to point to that new edge starting at intercept 48. Referring to FIG. 7d, as scanline 6 proceeds to the left and edge intercept 50 is encountered, this new edge intercept 50 does not match an edge existing at scanline 5, hence, a new edge is started at intercept 50. Since this new edge, starting at intercept 50, immediately follows a newly started edge at intercept 48, the edge started at 50 is made to point back to the edge started at 48, as a part of a pending x-order pointer system, as indicated by the solid arrow in FIG. 7d, and a pointer PNDLFT is made to point at the edge starting at 50. Thus, the pointer PNDRT always points to the right edge of a consecutive chain of pending new edges started at the current scanline (for scanline 6, to the edge started at 48), while the pointer PNDLFT points to the left edge of this chain (the edge started at 50 in scanline 6). When, as in FIG. 7e, a new edge intercept (at 52) matches a visible edge (edge 42) the x-order pointer of that edge 42 (indicated by the solid line in FIG. 7d) is given to the edge pointed to by PNDRT (the edge starting at 48 in FIG. 7e), while the x-order pointer of that edge 42 indicated by the solid arrow in FIG. 7e, is made to point to the newly started edge at 50, which is pointed to at that time by PNDLFT, resulting in the x-order pointer structure shown in solid arrows in FIG. 7e, showing completed processing of scanline 6 and the x-order structure required by the terminals 18a–18n.

Note that a "match" is defined as a visible edge and a new edge intercept with the same bounding surfaces, for example, referring to FIG. 7a, edge 34 and edge intercept 46 match at scanline 6 because, referring to FIG. 3, the parameters slast, sl, and sr for edge intercept 46 are the same as the corresponding parameters for the edge intercepts resulting in edge 34 in FIG. 7a.

In summary, the invented visible edge encoder 16 receives from the RAM 15, for each scanline intercepted by edge projections, edge intercept definitions ordered as the scanline proceeds from right to left, constructs 2-D visible edge definitions from these edge intercept definitions, concurrently keeps an x-order pointer structure, as shown by solid arrows in FIGS. 4 and 7a–7e, and transmits to the terminals 18a through 18n sets of edge definitions words of the type shown in FIGS. 5 and 6.

A current edge pointer system is used, as shown by the dash arrows in FIGS. 4 and 7a–7e, and is updated as shown in FIGS. 7a–7e. Thus current edge pointer system is used to keep track, from right to left, or those visible edges which have crossed the immediately previous scanline and have not been terminated. In FIG. 4, the current edge pointer for scanline 5 points to edge ①, then to edge ④, which has not been terminated at scanline 5, then ⑨, then to ⑧, then skips edge ② because it has been terminated, and points to edge ⑦ For scanline 6 in FIGS. 7b–7e, the current edge pointers are also shown by the dash arrows.

FIG. 8 shows a generalized block diagram of the major section of the invented visible edge encoder 16. These major sections are: a scanline buffer 100, a free pointer stack 102, a current edge pointer stack 104 comprising ping-pong stacks 104a and 104b, a visible edge buffer 106 and an assembler 108 including a visible edge input register 110, an edge intercept input register 112, and an output register 114. The scanline buffer 100 can hold 256 edge intercept definitions of the format shown in FIG. 3, and is a RAM loaded in burst mode either from the RAM 15 which contains a previously stored set of edge intercept definitions of the type shown in FIG. 3 or from the visible surface processor 14. The visible edge buffer 106 is a RAM that can store 1,024 edge definition words of the format shown in FIG. 5. The free pointer stack 102 can contain 1,024 pointers, each ten bits long. The current edge pointer stack 104 contains two units, each 256 words long, each word being 10 bits. The assember 108 contains the necessary control circuitry and input and output registers. RAM stands for random access memory.

In operation, one of the current edge pointer stacks 104a and 104b contains pointers to those visible edges in the buffer 106 which have crossed the previous scanline and have not been terminated, for example, the stack 104a may contain the dash arrow pointers shown at scanline 5 of FIG. 4, As scanline 6 of FIG. 4 is being processed, the pointers of stack 104a are read out to identify the next visible edge from the buffer 106 which is to be compared with a new edge intercept of the intercepts 46, 48, 50 and 52 in scanline 6 of FIGS. 7a–7e. This limits the search of the matchings to only those visible edges which have not yet been terminated. In the example of FIG. 4, the processing of scanline 6 will not involve comparison of new edge intercepts with edges ⑤,⑥,② and③ As scanline 6 is being processed, the current edge pointer structure shown in FIGS. 7b–7e by dash arrows is written into the stack 104b, to be ready for the processing of scanline 7, etc. Note that during the processing of scanline 6 of FIG. 4, edge② has been terminated on scanline 5 (it has been given a flag lf of 1), this flag having been derived for the RAM 15 from knowing that this edge ② is a projection of an original 3-D edge which has ended. However, when an edge is not known to have ended, as for example, if edge ④ in FIG. 4 becomes invisible to the observer at scanline 6, but was not invisible at scanline 5, that edge ④ is given lf = 0 in the RAM 15. A flag lf of 0, and a current edge pointer for it is maintained for scanline 5 in the visible edge encloder 16, as shown in the dash arrows in FIG. 4.

The current edge pointers in the stack 104 are terminated if the pointed to edges are not matched on the following scanline. They are terminated either just after a match has occurred or at the end of the scanline processing period. That is, each new edge intercept is compared from right to left with the current edges to the left of the last matched visible edge. If no match is found, a new visible edge is created for the edge intercept which is being compared, and is terminated if its flat *lf* is 1, and then a new edge intercept is compared, etc. However, if a match is found, the matched current visible edge is extended, and then all current visible edges that were skipped by, back to the last one matched, are terminated. Thus, in FIG. 4, on scanline 6, edge ④ is terminated after edge ⑨ is updated. The pointer to each edge which has been updated or created is added to the current edge pointer stack 104a or 104b for use on the next scanline.

When a new edge is created, such as the edge starting at edge intercept 48 in FIGS. 7a–7e, a definition for this edge is placed in a free location of the visible edge buffer 106, and the x-order pointer to this edge is made to point to this location in the visible edge buffer 106. The free pointer stack 102 keeps track of the available locations in the buffer 106, and supplies those when needed to store a new edge definition in the buffer 106.

In order to minimize the search time for a match between each new edge intercept with the visible edges pointed to by the current edge pointers, a second 1-bit flag, *nf* accompanies each edge intercept definition; when $nf = 1$, the edge intercept is the top of a new visible edge and thus can not match any previously found visible edge. This is derived from information stored in the RAM 15 when the edge intercept results from the top of a 3-D edge. Thus, only new edge intercepts whose flags *nf* are 0 need be compared with the edges pointed to by the current edge pointers in the stack 104a or 104b.

The visible edge buffer 106 stores, for each visible edge, a definition of the format shown in FIG. 9. Each visible edge is defined by: the x-coordinate of its top, its slope, the y-coordinate of its top, the brightness at its top, the brightness at its current bottom, the color associated with that visible edge, a two-bit flag T indicating the transition between smooth and flat, the parameters slast, *sl*, and *sr* discussed above, a parameter DN which is set to 0 when an edge is created and remains 0 until the edge is terminated, at which time it is set to 1, and a parameter PX which is set equal to the pointer PDNLFT at the time the edge is created and may be changed later to point to the location in buffer 106 of the edge pointed to by the solid line arrow x-order pointer. When a new edge of the format shown in FIG. 9 is placed in the visible edge buffer 106, the pointers PNDLFT and/or PNDRT in the pointer stack 102 are set to point to the location of that new edge definition in the visible edge buffer 106.

When a visible edge of the format shown in FIG. 9 is first created, for example, the visible edge starting at edge intercept 48 in FIG. 7c, the correspoinding values of the edge intercept definition (FIG. 3) are loaded into the corresponding value locations of the visible edge definition (FIG. 9), DN in FIG. 9 is set to 0 and PX in FIG. 9 is set equal to PNDLFT. As an edge is updated, the value of $B^c$ (current bottom brightness of its definition (FIG. 9) is replaced by the brightness value for the new scanline intercept. When the x-order pointers must be updated, as in FIG. 7e for example, the value of PX of a visible edge definition may be replaced with the contents of PNDLFT, the old contents of PX going to the PX of the visible edge pointed to by PNDRT, as indicated in FIG. 2e. When a visible edge is terminated on scanline $Y_{bm}$, its slast is replaced with an 11-bit interger H whose value is the difference of $Y_{bm}$ and $y^t$, and the value of $B^c$ (the brightness at the bottom of this visible edge) is replaced by G defined as $$G = \frac{(B^c - B^t) \times 2^{11-M}}{H}$$

The RAM 15 may store switchings closer than two units out of 1600 in x, and the visible edge updating in the encoder 16 may not follow exactly that of the original edges from which the edge intercept definitions are derived; hence, visible edges may come closer than two units out of 1600 units in x. Thus, the scanline processing which creates, updates, or terminates visible edges is extended to compare the x-intercepts of each new or extended visible edge, with the result that at times an extended visible edge may be terminated or even deleted because it has approached another edge too closely. Thus, the spacing in x criteria may result in the deletion of an edge intercept definition because it has come too close to a previously extended visible edge, or the termination of a visible edge which has been tentatively updated but forced to terminate on the previous scanline.

When the visible edge buffer 106 is full, or contains a completed block of edges (1024 edges), the assembler 108 freezes most of the circuitry of FIG. 8, enabling only a section which begins with the contents of a register pointing to the beginning of the x-order pointer structure (i.e., a register reflecting the arrow labelled LEFT in FIG. 4) to begin reading through the x-order pointer structure, e.g., as shown in solid arrows in FIG. 4. As each edge definition of the format shown in FIG. 9 is outputed from the visible edge encoder 16, all edge locations in the buffer 106 storing edge definitions with DN of 1 (for terminated edges) are returned back to the free list of the free pointer stack 102. Edge locations in the buffer 106 storing edge definitions with DN of 0 (for unterminated edges) are not placed in the free pointer stack 102. Rather, only the x-order pointers of such unterminated edges are appropriately updated to leave behind an appropriately x-ordered set of unterminated visible edges.

Referring to FIGS. 10a–10d which show a detailed diagram of the invented visible edge encoder 16, at the beginning of a write-read cycle (a cycle is the attempted matching between an edge and an intercept) the edge intercept input register 112 contains an edge intercept definition of the format shown in FIG. 3 and the visible edge input register 110 contains a visible edge definition of the type shown in FIG. 9. In addition, the edge intercept input register 112 contains a flag V which flags the data in the register 112 as valid if set to 1, or invalid if set to 0 (indicating that there are no more edge intercept definitions). The visible edge input register 110 contains, in addition to the visible edge definition of the FIG. 9 format, flags CVE and LA, where CVE = 1 means that the data in the register 110 are valid and LA = 1 means that this is the definition of the last visible edge pointed to by the current edge pointer stack 104 (i.e., it is the leftmost visible edge on a scanline). Additionally, register 110 contains the address RDA in the visible edge buffer 106 of the edge which is currently in the register 110. A multiplier-adder 116 performs the operation indicated in its block to find the x-intercept of the visible edge in register 110 with the current scanline identified in a current scanline register 118, which is updated with each scanline. The unit 116 provides the x-intercept $x_i$.

A comparator 120 generates an output MO which is 1 if the surface parameters T, sl, sr, slast of the visible edge and of the edge intercepts in the registers 110 and 112 respectively are equal. If either the inputs of the comparator 120 are not the same and LA = 1, or the visible edge in the register 110 is flagged as invalid by CVE = 0, or the edge intercept in the register 112 is for a new edge (its nf is 1), the contents of the register 112, rather than the contents of the register 110, are fed to the output register 114 via select networks 122a and 122b, which additionally selects the x intercept of the data in the register 112. Referring to FIG. 7c for an example, this can be the case where the edge intercept at 48 is in register 112 and is compared with the edge (36) in register 110, and a new visible edge, started at 48 is to be placed in buffer 106. Since the definition of the newly started visible edge, which is now in the output register 114, is not to be written back at the address in the buffer 106 of the visible edge that is presently in the register 110, but rather in a free location of the buffer 106, a new, free address is provided by the stack 124 which is a part of the free pointer stack 102 in FIG. 8. That is, the new visible edge definition currently in the output register 114 is directed to the buffer 106 address identified by the output P1 from network 122a, which output P1 is made equal to the output FA from the free address stack 124, rather than to the value of RDA in the register 110. The input G7 of the free address stack 124 is raised to increment the free address stack 124 to the next free address of the visible edge buffer 106, unless the input IFU of the stack 124 is at this time raised, in which case no incrementing of the stack 124 takes place. A select network 126 selects for its output the input from the register 112 rather than the input from the unit 116, upon the occurrence of a signal E1. The same signal E1 selects for the updated PX in register 114 (x-order pointer) the pointer PNDLFT in register 130, where PNDLFT in register 130 may contain the location of a newly created visible edge (which, if it does exist, has forced a flag PND in an FF register 128 to be set and the PNDLFT register 130 to be loaded with the location of that newly created visible edge in buffer 106). At the end of the read-write cycle for the current contents of registers 110 and 112, if PND in FF register 128 is 0, it is set to 1 and the contents of PNDLFT register 130 are replaced by P1, the location in buffer 106 where the new edge from register 114 is to be written. Additionally, PNDRT register 132 is at this time loaded with P1 if the newly created visible edge was not preceded by another, previously generated edge (flagged by PND = 0). Thus, PNDLFT register 130 at the end of the write-read cycle for a scanline is loaded with the location of the leftmost pending edge to be written back in the visible edge buffer 106 during the following write cycle.

If PND in register 128 is 0 during a cycle where a new visible edge is created, PNDLFT register 130 at this moment contains no useful information since the x-order structure is to be put into a pending state by this first newly created visible edge. In this case, select network 122c passes to the output register 114 the PX value of a pointer saved in a register 134 so that a different PX can be stored at the buffer 106 address pointed to by the contents of PNDLFT register 130. That is, when the first edge of a chain of new edges is written into the visible edge buffer, the PX portion of the edge definition is a "don't care", therefore, any pending required storing of a pointer PX at another location of buffer 106 is permitted at the same time. L register 134 is, when required, loaded with the PX of the rightmost edge of a sequence of pending edges. When a matched edge is encountered, its PX is saved in L-register 134 and replaced by the contents PNDLFT register 130 before it is written back, so that it points to the edge of a chain of pending edges as in FIG. 2e. Since the pointer for the right edge of the pending chain can not be updated or corrected at this time, a K flip-flop in register 128 is set indicating that L-register 134 contains a pointer to replace the PX value of the edge pointed to by the contents of PNDRT register 134. Thus, when a new visible edge is created following a matched edge which has set K in register 128, the contents of PNDRT register 132 point to the edge which should point to the edge that had previously been pointed to by the matched edge. Referring to FIGS. 7d and 7e, while the edge definition of the edge starting at point 48 is being stored from the output register 114 into the visible edge buffer 106, since no x-order pointer PX is available for it at this time, it is stored in buffer 106 without a PX value, and the same cycle is used to store in buffer 106 the PX value for another edge which was stored in buffer 106 without a PX value, but whose PX value was left in L-register 134.

Since the contents of PNDRT register 132 are not altered until a new edge is created with PND = 0, the updating of the PX value for an edge stored in buffer 106 at the address pointed to by the contents of L register 134 can be done during that cycle where E1 = 1 and PND = 0. Thus, since on those occasions when PX for an edge passing toward the output register 114 is a don't care PX, the address for that PX can be set to that currently in PNDRT register 132. Thus, two addresses of buffer 106 are always defined during a write cycle, one for PX (in PXWA register 136) and one for the remaining portion of the edge word (in EWA register 138).

If E1 = 0, the old visible edge definition in register 110 for a matched edged intercept pass toward the output register 114, together with its old address RDA in buffer 106, while its x intercept xi, as computed by network 116, passes through select network 126. If this edge follows a pending edge or edges in an x-order chain, its PX is replaced by the contents of PNDLFT register 130 via select network 122c.

For either of the E1 = 1 and E1 = 0 cases, if the previous pending edge is in a pending x-order pointer structure is to be terminated because of the spacing in x criteria discussed below, and if there are two or more pending edges in the pending chain (EQ = 0, in a comparator network 140), the edge gated toward output register 114 is given a PX equal to the location of the pending edge to the right of the pending edge to be deleted. The buffer 106 location of this previous pending edge is saved in PNDLFTS-register 142 where PX is set via select network 122c. Using the pointer in PNDLFTS-register 142 rather than that of PNDLFT register 130 has the effect of deleting the edge pointed to by PNDLFT register 130. When the write/read clock occurs, the contents PNDLFT register 130 move into PNDLFTS-register 142, and P1 enters PNDLFT register 130. Referring to FIG. 7e, this would be the case if the newly created edge starting at 50 is too close to extended edge 42 to satisfy the spacing in x criteria, and this newly started edge at 50 is therefore deleted.

Edge data approaching output register 114 are put in a terminated form by network 144, 146, 148 and 150 enabled by signal TE which is true if (1) the edge going to the output register 114 is a matched edge with $lf = 1$, (2) this edge was a visible edge skipped by between successful matchings, as for example, edge 36 in FIG. 7e would be skipped by between the successful matchings at scanline 6 of points 46 and 52, or (3) this edge must be terminated at the scanline immediately above the current scanline as indicated by register 118 because this edge and/or the following edge are too close to each other or to neighboring edges. Edges forced to terminate after the following edge is read are terminated two cycles later, that is two cycles after they are updated.

The spacing in x criteria referred to above required that when an $j$ is updated at a distance greater than three units in x from the last edge encoded ($j-1$), this edge $j$ is latched onto and its $xi$ value, provided from networks 116 and 126 is latched onto (placed in XLATCH register 152), that is this edge $j$ may never be deleted by a following edge which is too close to it. Each edge being encoded has its $xi$ value placed in XLAST register 154, whether or not it is latched onto. If a following edge, $j + l$ approaches less than three units in x from the last edge (provided this last edge $j$ was not forced to be terminated), edge $j + 1$ becomes a new last edge but not the latched edge. At this point register 152 contains a value for edge $j$ and register 154 contains a value for edge $j + 1$. Following edges $j + 2$, etc., if they are separated from the edge whose $xi$ value is a register 152 by more than four units in x, do not cause the termination of the last edge $j + 1$.

Thus, each time an edge becomes a latched edge $j$, its $xi$ is placed in register 152. Each time an edge $j$ becomes a last edge, its $xi$ is placed in register 154. When the $xi$ value of an edge $j$ is placed in register 154, the location of that edge $j$ in the visible edge buffer 106 is always placed in ILAST register 156, and the old brightness (unupdated brightness) of this edge $j$ is placed in BLAST register 158. Thus, an edge which is last but not latched onto, is tentatively terminable and thus may need to be terminated on the previous scanline without its brightness updated. Since all edges which are unterminated are updated, each edge must have its brightness and location remembered, and this is the purpose of registers 152, 154, 156, and 158.

When the contents of registers 152 and 154 are not the same, and their contents are less than four units in x apart, the edge whose $xi$ is stored in register 154 is terminated (or deleted if it is a newly created edge), and the next $xi$ which comes through network 126 is loaded into register 154 without changing the contents of register 152. If, when the contents of registers 152 and 154 are not the same, the $xi$ coming from network 126 is four or more units in x from the value stored in register 152 but less than three units in x from the value stored in register 154, the contents of register 152 are replaced by those in register 154 and that new $xi$ is stored in register 154. That is, the process moves forward, latching onto the next edge. When a following edge intercept is greater than or equal to three units from the contents of register 154, both register 152 and 154 take on the x intercept of that new following edge.

Thus, returning to the termination rule, an edge is terminated at the scanline just prior to the current scanline (1) when for a pair of consecutive edges neither is latched onto where the leftmost of a pair of consecutive edges follows less than four units in x from the edge latched onto, or (2) when one edge follows a second edge which has been latched onto but is less than 1 unit away. Terminations because of case 2 discussed immediately above are made at the time an edge to be terminated is being encoded, since its x intercept information is present at that time. In such cases, the $B^c$ passing toward the output register 114 must be the old value, not the updated value selected by select network 160. If an edge is terminated because the following edge's x intercept is less than 4 from the latched onto edge which preceded it, the edge to be terminated must be read back from the visible edge buffer 106 two cycles later and terminated. Thus, when the spacing in x is less than 4 criterian terminates an edge, this sets a flag PT in a register 162 and transfers the brightness and location of the last edge (i.e., the brightness and location information in registers 156 and 158) into registers 164 and 168 (at the end of the write/read cycle).

Figure 10D:
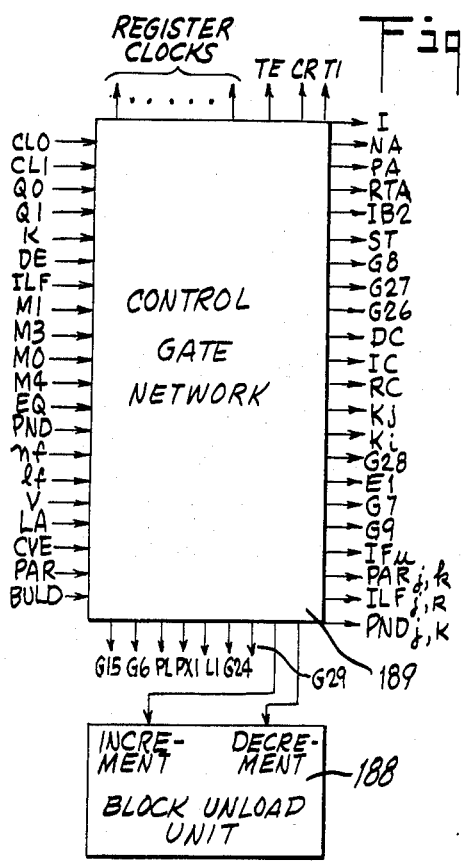
FIGS. 10a and 10b, which fit together as shown in FIG. 10, and FIGS. 10c and 10d are detailed block diagrams of the visible edge encoder.
Figure 11A:
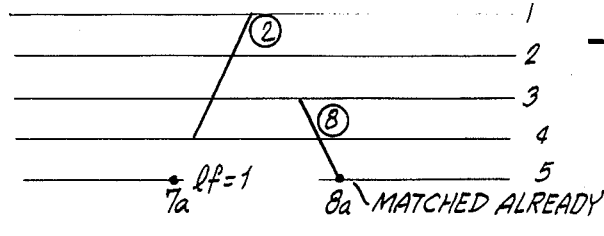
FIGS. 11a through 11g illustrate various combinations of edges and edge intercepts.
Figure 11B:
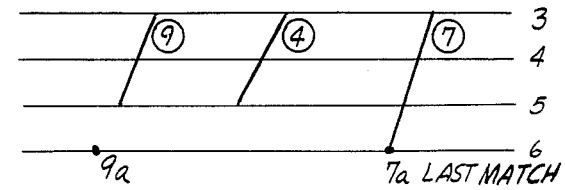
Figure 11C:
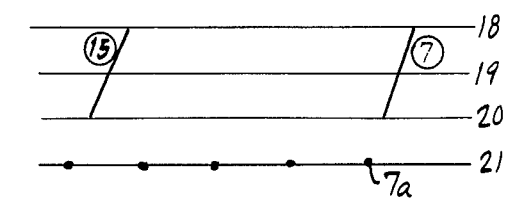
Figure 11D:
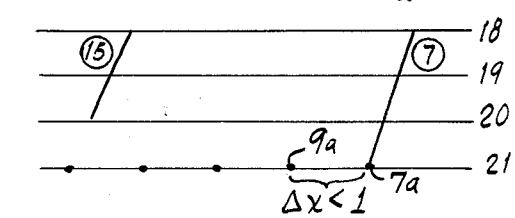
Figure 11E:
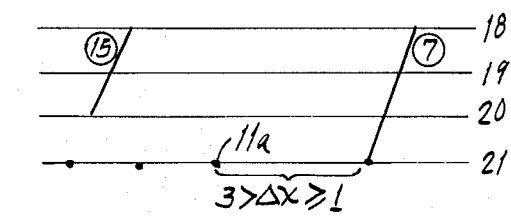
Figure 11F:
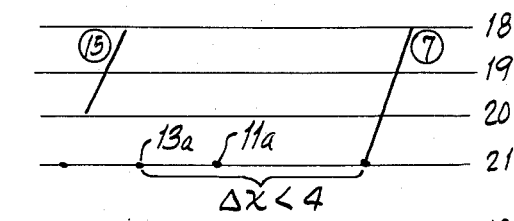
Figure 11G:
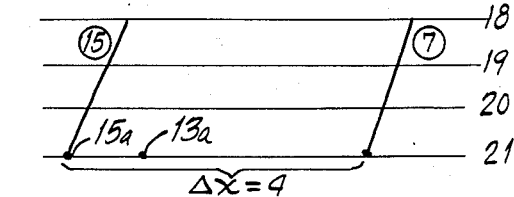

FIGS. 11a through 11b illustrate the termination or deletion of edges. FIG. 11a illustrates the case of an edge placed in the terminated form (i.e., stored back in the buffer 106 with a flag DN set to 1) because it is a matched edge with $lf = 1$. Referring to FIG. 11a assume that edge ⑧ has been matched with a point 8a on scanline 5 and now the edge definition for edge intercept 7a whose flag $lf$ is 1 is being compared with edge ②. When the updated edge definition for edge 2 gets from register 110 in FIG. 10a to output register 114, its DN flag is set to 1 for storage back into visible edge buffer 106, because this point 7a is the last point of edge ②. Referring to FIG. 11b, assume that edge ⑦ was extended to point 7a on scanline 6, edge intercept 9a was compared with edge ④ but no match occurred and now edge intercept 9a is being compared with edge ⑨ and a match is found between edge ⑨ and edge intercept 9a. This means that edge ④ should have been terminated at scanline 5, i.e., it is a visible edge skipped by between successive matching at points 7a and 9a, and it is terminated at scanline 5 as discussed above in connection with registers 152–168. Referring to FIG. 11c, suppose for scanline 21 edge intercept 7a is compared with edge ⑦ and as a result edge ⑦ is extended as shown in FIG. 11d, and the updated edge definition for edge ⑦ is sent from output register 114 back into visible edge buffer 106. Now, referring to FIG. 11d, edge intercept 9a is compared with edge ⑮, but the spacing in x between edge intercept 9a and the edge intecept of edge ⑦ with scanline 21 is less than one unit. Edge intercept 9a would therefore be deleted as a result of a comparison performed in network 153. Referring to FIG. 11e, now the next edge intercept 11a is compared with the x intercept of the bottom of edge ⑦, which is two units away. Edge intercept 11a would not be deleted through the comparisons in network 153. In FIG. 11f, edge intercept 13a is less than 4 units away from edge ⑦, hence network 153 determines that intercept 11a is to be deleted. In FIG. 11g edge intercept 15a has a successful match with edge ⑮ and would extend edge ⑮ with edge intercept 13a remaining undeleted. Note that in FIGS. 11d, 11e and 11f, if edge intercepts 9a and 11a were matched with edges existing at scanline 20, these edges would be terminated for scanline 21.

Referring back to FIGS. 10a and 10b, when the spacing in x criteria is met (the spacing in x is less that 4 units) the next write/read cycle is not "stolen" for the termination of the previous edge, but the cycle following that is stolen to give PT register 162 time to apply its address. This is because the source of the enable input to PT register 162 is derived from a spacing in $x$ calculation in unit 153 and is not available during a write/read cycle in time to select an address in buffer 106. Thus, in the middle of the next write/read cycle following the cycle where this type of termination has been detected as necessary, i.e., when PT register 162 is at 0, the contents of register 168 are used as a read address for buffer 106 so that at the beginning of the next write/read cycle, the edge to be terminated is in the visible edge input register 110. The contents of register 168 are moved into register 170 and register 172 is set (enabled by PT register 162). Thus, for this next cycle, when the edge to be terminated resides in the visible edge input register 110, register 172 has been set, flagging to the pertinent circuits in FIGS. 10a and 10b that this is a write/read cycle being stolen and that data contained in other registers should be frozen, i.e., edges are not to be compared with edge intercepts during this particular write/read cycle.

When register 172 is set to 1, the contents of register 170 are selected as input to the output register 114 through select network 174. The read address RDA is fed on by gate network 122a as a write address P1 to the output register 114, and TE is raised forcing the edge currently being applied to the output register 114 to be put in the terminated state when clocked into this output register at the end of the write/read cycle.

When PTD = 1, the contents of register 170 are selected as input to the output register 114 through select network 174. The read address RDA from register 110 is fed on by network 122a as a write address P1 to the output register 114, and TE is raised forcing the edge that is being forwarded to the output register 114 to be put in a terminated form when clocked into the register 114 at the end of the write/read cycle. During cycles when the contents of register 152 and 154 are not the same, a flag ILF in register 128 is set.

During the write/read cycles when the visible edges skipped by between two matched edges are being terminated, PAR in register 128 has been set equal to 1, and E1 has been set equal to 0. These two conditions force the visible edge definition to pass unupdated from register 110 to register 114. Since a termination is required, TE is true on these occasions, causing the edge residing the output register 114 to be terminated appropriately.

When an edge is terminated to a previous scanline, the parameter H for it that goes to ouput register 114 is set to the difference between the current scanline in register 118 minus the top scanline of this edge minus 1, by network 176, where the input I to this network 176 is 1. For edges terminated on the current scanline, the input I to network 176 is 0, so that the parameter H going to output register 114 for these edges is simply the difference between the contents of register 118 and the $y$-coordinate of the top of these edges.

When PAR = 1, an edge which was previously skipped by is residing in the input register 110 and is being terminated. When visible edges were skipped by, each mismatch between a new edge with $nf = 0$ and a visible edge increments PAC counter 178 (FIG. 10c) from a value of −1 through 0 and up. When PAR is being enabled (setting PAR in register 128 on the write clock), or when PAR = 1 (and PAC counter 178 is not at −1) the PAC counter 178 counts down as each of the visible edges is terminated until counter 178 has returned to −1. However, one cycle earlier, at count 0, an input IB2 to current edge stack 104 is raised, forcing the address circuits of the stack 104 to skip by the address of the matched visible edge which triggered the return to the first of a group of unmatched visible edges, so that group of edges can be terminated. When counter 178 has reached 0, PAR in register 128 is reset on the read clock (clock 2) when counter 178 and the address circuits inside stack 104 are clocked during a write/read cycle.

Each time an edge is to be written back unterminated from output register 114 into buffer 106, ST input to stack 104 is raised so that P1 (the edge's location in the buffer 106) is added to the other pointer stack in the stack 104 on clock 1. If this edge has, because of a spacing in $x$ criteria, forced the previous edge to be terminated, it is added to the pointer stack 104 to replace the last pointer stored there by raising the input line STA to stack 104. At the end of a scanline encoding period, when CVE and V are zeros, a PP flip-flop 180 is toggled so that the two stacks 104a and 104b swap their function for the next scanline and code period.

When the next visible edge address is required from the stack 104a or 104b, input NA to stack 104 is raised, ahead of the read clock 2 during the write/read cycle. The address A' that appears after clock 2 is that "next address" required to read the next visible edge from buffer 106. If input RTA to stack 104 is held high when NA is high, this address A' is saved in order that is may be returned to at a later time. This return to a previous address is caused whenever the PA input to stack 104 is high, rather than NA, at clock 2 time. If on clock 2 input IB2 to stack 104 is 1, the address of A' will not differ were IB2 = to 0; however, the next address in stack 104 will be skipped by when NA is raised again. When NA = 1 and no more edges are available in edge buffer 106, CVE' from stack 104 is lowered on clock 2. If NA = 1 and the next edge from the buffer 106 is the last edge there, LA' from stack 104 is raised on clock 2.

Scanline buffer 100 is addressed by network 182 which increments upon each new address request at its input NB. If no more data are present in scanline buffer 100, the V' output of network 182 is lowered on clock 2, otherwise it is raised on clock 2. This network 182, like the address network of stack 104, is advanced on the read clock 2. When scanline buffer 100 is loaded, the BG input to flip-flop 180 and the BG + 1 input to network 182 are raised during consecutive write/read cycles T and T + 1 respectively. When BG is raised, the network shown in FIGS. 10–10c is cleared and stack 104 is advanced internally to prepare for the first request of an address. During BG + 1 on clock 2, the first address appears from stack 104 and from network 182 so that after the following write clock 1 at the end of the write/read clock period, input registers 110 and 112 contains the first edge and the first edge intercept which are to be compared. On this clock, DE in register 128 is set, to represent that the circuits of FIGS. 10a–10c are in a busy condition and to permit writing into buffer 106 from output register 114. When the end of visible edge buffer 106 and scanline buffer 100 are encountered, and there are no more edges pending to be terminated, or addresses to be updated, DE is cleared, permitting reloading the scanline buffer with a new batch of scanline intercepts from RAM 15.

During a read cycle, which is the second half of the write/read cycle, select networks 184 and 186 select addresses from pointer stacks 104a and 104b, or from a block unload unit 188, which unloads the visible edge definitions in buffer 106 for transmission to display terminals. During the write cycle, select networks 184 and 186 select addresses from write address registers PXWA 136 and EWA 138 respectively. Network 184 supplies addresses to a portion of the visible edge buffer containing the PX portions of the edges stored there, while select network 186 supplies addresses to the remaining portion of the visible edge buffer 106. RAS flip-flop 190 is set to 1 during the read cycle when the ILASTS input to select network 192 (from register 164) is to be used as a read address (when PT register 162 is at 1); otherwise, RAS flip-flop 190 is cleared.

During block unloading (after the number of visible edges in buffer 106 has reached the limit permitted for a block of edges, BULD in register 128 is set. BULD = 1 disables all visible edge encoding, freezing all but the visible edge input and output registers 110 and 114 and LEFT register 194 containing the X pointer to the leftmost edge in the x-order string of edges. The contents of register 194 are used to enter the x-order sequence of edges in buffer 106 and the PX of each edge, read in turn from buffer 106, is used as the next read address for the buffer 106. Each edge read with DN = 0 (unterminated) is returned to its old address in buffer 106 but with its PX changed, if needed, so that it does not point to the edges which are flagged with DN = 1, but points to the next edge in the x-order sequence whose DN is 0. The edges which are being read out and whose DN = 1 are deleted during the unload process and their addresses are put back into the free pointer stack 124.

In summary, the network shown in FIGS. 10a–10c receives from the RAM 15 successive sets of up to 256 scanline edge intercept definitions and stores these sets, one set at a time, in scanline buffer 100. The edge intercept definitions from scanline buffer 100 are placed one at a time in edge intercept input register 112 and are compared, one at a time, with those visible edge definitions from visible edge buffer 106 which intersected the preceding scanline and were not terminated, i.e., the visible edges pointed to by the current edge pointers in one of the stacks 104a and 104b. The comparison is between one edge intercept and one visible edge at a time. Depending on the comparison, and depending on the spacing in x criteria determined with the help of network 153, a new edge is started and a new edge definition is put in visible edge buffer 106, or an existing edge definition is modified to extend the edge to the current scanline, or a visible edge definition is marked as terminated (ending on this or the previous scanline). When, after scanline buffer 100 has been successively loaded with a succession of edge intercepts for different scanlines, visible edge buffer 106 contains a complete block of visible edge definitions, this block is read out and sent to the communications controller of a set of display terminals, together with suitable control information which indicates which display terminal should receive that block and how that block should be loaded into the display terminal. When the block of visible edges in visible edge buffer 106 is being read out for transmission to the display terminals, the edge definitions for visible edges which have ended within the block (terminated edges) are read destructively and their addresses in visible edge buffer 106 are returned to free address stack 124. Those visible edges which have not terminated are read out nondestructively, and their x-order pointers are modified if necessary such that the remaining visible edges in buffer 106 are linked in a single strand x-order chain of the type shown in solid arrows in FIG. 4. Then, scanline buffer 100 is loaded again with a successive scanline edge intercept information, and a new block of visible edges starts being built in visible edge buffer 106. This process is repeated for as many blocks of visible edges as required to drive a set of display terminals.

Figure 10C:
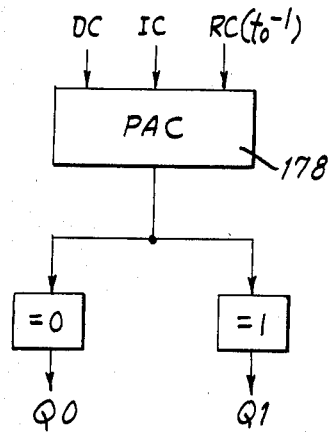
Figure 12H:
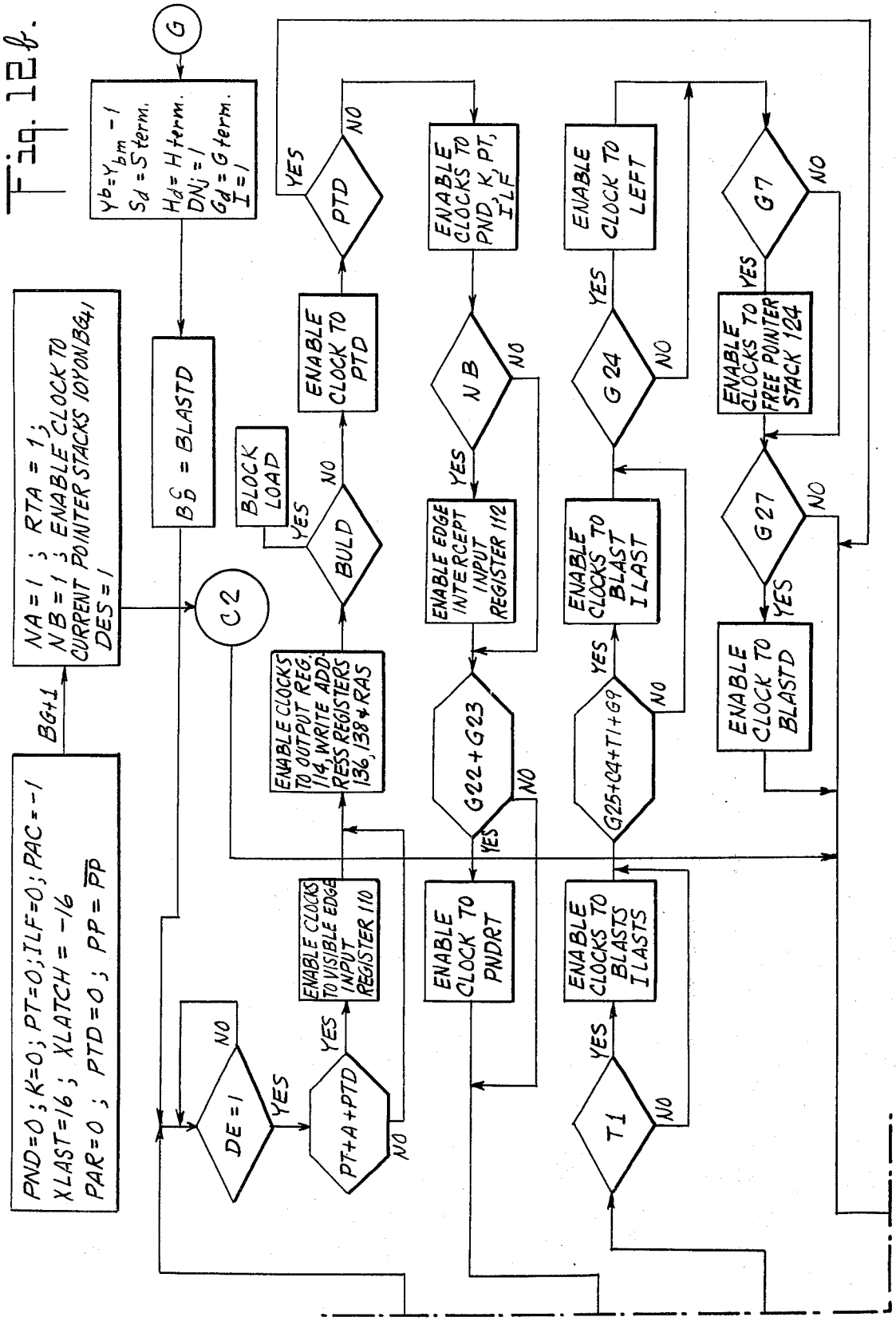
FIGS. 12a–12f, which fit together as shown in FIG. 12, and FIG. 12g are a logic diagram illustrating the logic conditions generating control signals for the network shown in FIGS. 10a–10d.
Figure 12D:
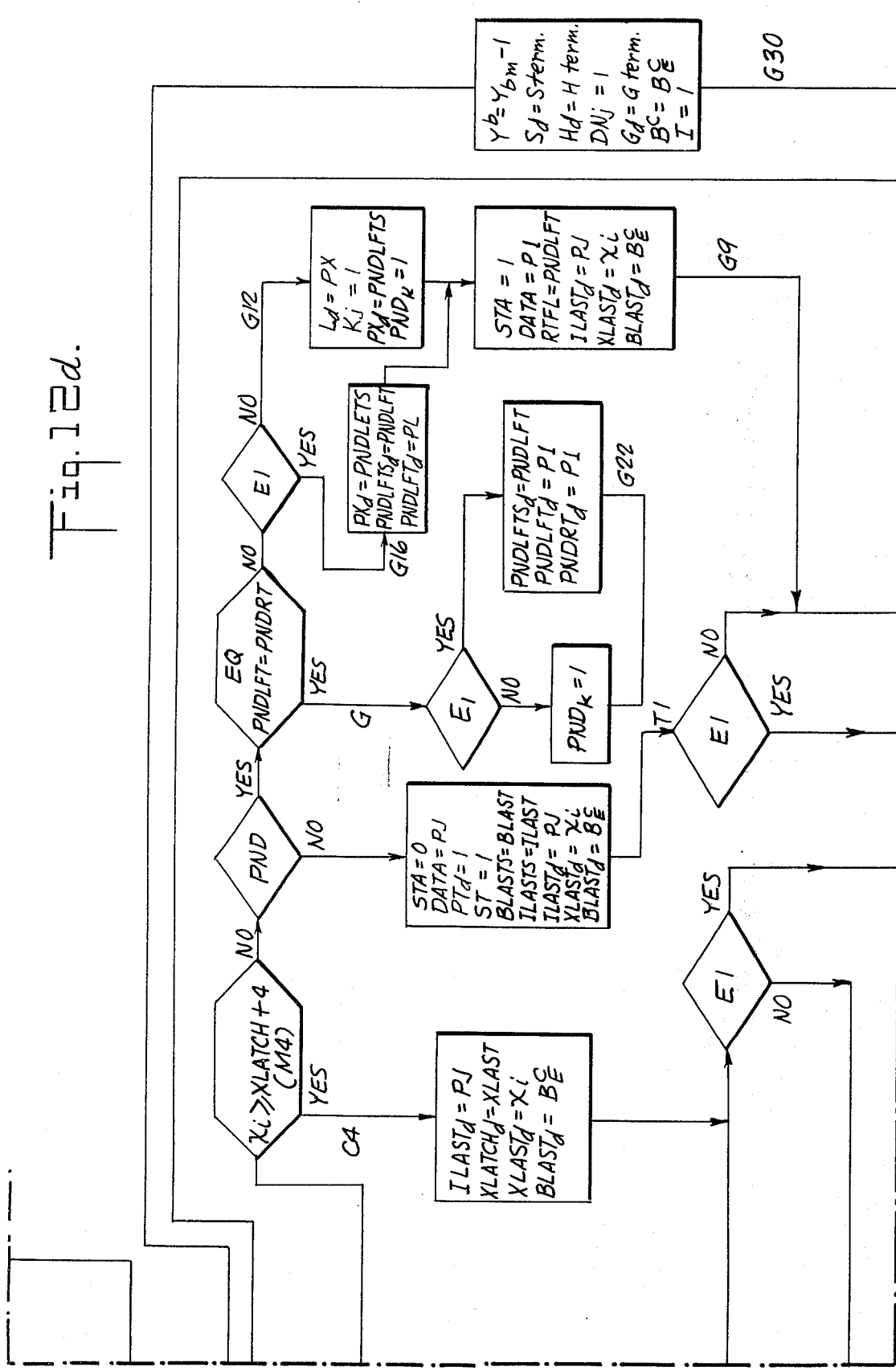
Figure 12E:
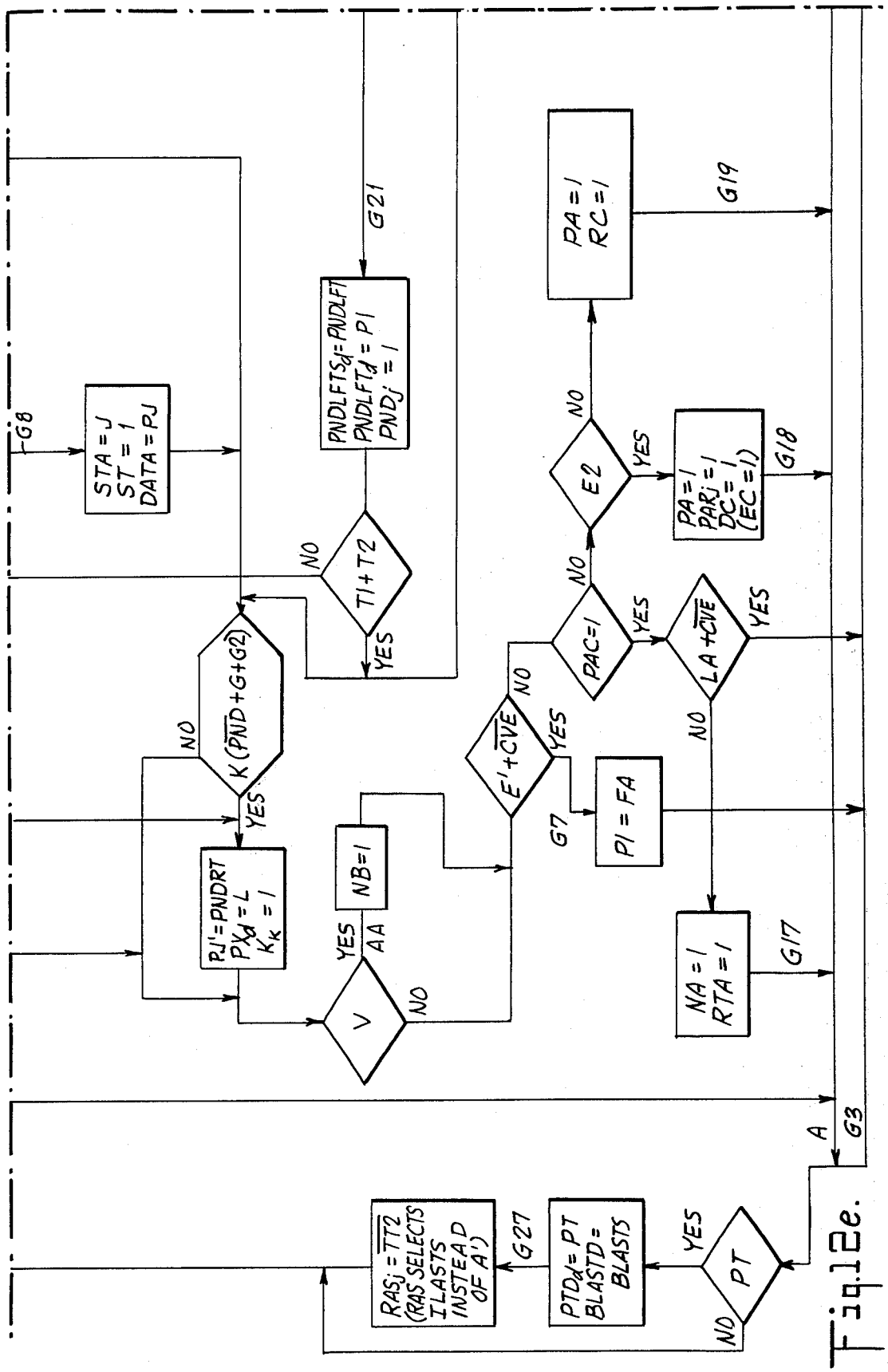
Figure 12F:
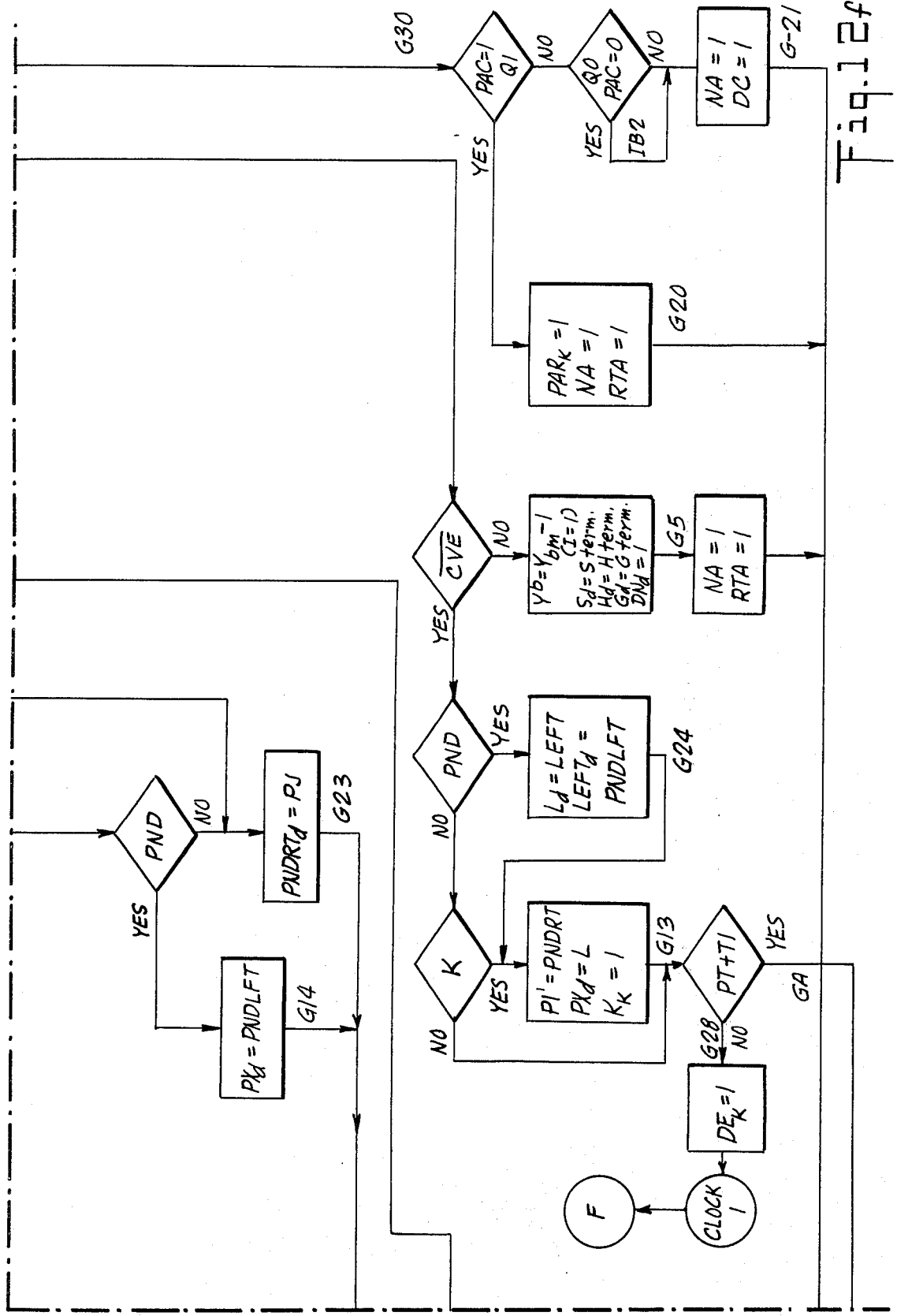

The system in FIGS. 10a–10c is driven by only two clocks. A read/write clock (also called clock 1) and a read clock (also called clock 2). The first part of a pulse of the write/read clock is for writing into registers or memories and the second part of the write/read clock is for reading from registers and memories. The read clock 2 occurs inbetween the two parts of the write/read clock pulse. The control signals discussed in connection with FIGS. 10a–10c are derived by a control network shown in FIG. 10d and comprising a plurality of gates receiving the shown input control signals and providing the shown output control signals. Rather than show the specific gate structure, with a great multiplicity of connections betwen gates, the control gate network of FIG. 10d can be described with greater clarity by showing the Boolean logic structure for providing the necessary control signals, and this is done in connection with FIGS. 12a–12f, which fit together as shown in FIG. 12. Referring to FIGS. 12a–12f, the rectangular boxes represent gates which receive signals from elements of FIGS. 10a–10d and direct those signals, upon the occurrence of certain conditions, to other elements of FIGS. 10a–10c. The other boxes in FIGS. 12a–12f represent gates which test signals either against each other or against 1 or 0, and the circled elements in FIG. 12f represent either clocks or pointers to other parts of FIGS. 12a–12f. For example, referring to FIG. 12a, box 201 represents a gate network which receives as inputs signals C4 and C3, and tests the OR function of these signals against 1 to determine if the OR function of signals C4 and C3 is true (equal to 1) in which case the yes output of box 201 is activated, otherwise the no output of box 201 is activated. In implementation, box 201 may be an OR-gate which receives as inputs signals C4 and C3, with the output of the OR-gate going to an AND-gate whose other input is logical 1. If the AND-gate output is logical 1, this is the yes output of box 201. If it is 0, this is the no output of box 201. Box 203 in FIG. 12a represents a gate structure which receives as input a clocking pulse and outputs that clocking pulse to XLAST register 152 in FIG. 10b upon the occurrence of a yes output from box 205. In actual implementation, box 203 may be an AND-gate which receives a clock pulse as one input and receives the output of box 205 as another input. Note that FIGS. 12a–12g represent logical circuits, implemented by gates, and do not represent a flowchart for a process.

Starting at clock 1 in FIG. 12c, circuit 200 tests the contents of PTD register 172 (FIG. 10b) and if the test is true, i.e. register 172 contains a logical 1, the yes output of circuit 200 is activated, otherwise, if false, i.e., if PTD register 172 contains a logical 0, the output no of circuit 200 is activated. Assuming the test at circuit 200 yields a no, circuit 202 tests the contents of PAR in register 128 (FIG. 10a); on a true answer from circuit 202, circuit 204 tests the contents of V in register 112 (FIG. 10b); on a true answer from circuit 204, circuit 206 tests the contents of the CVE portion of register 110; on a true answer from circuit 206, circuit 208 tests the contents of the nf section of register 112; on a no answer from circuit 208, circuit 210 (which is comparator 120 in FIG. 10b) tests each of the surface labels in register 112 against the corresponding surface label in register 110 and the T flag of register 112 against the T flag in register 110; if the comparison in circuit 210 is true, the yes output of circuit 210 leads to point A, which represents the network shown in FIG. 12g. Referring to FIG. 12g, where the yes output of circuit 210 is given the label E2, circuit 212 tests the E1 signal (which is either the no output of circuit 206 or the yes output of circuit 208, and if E1 is true, circuit 214 in FIG. 12g operates select networks 122 in FIG. 10b to apply to output register 114 the contents of the $X_p$ section of edge intercept input register 112, etc. In circuit 214 the subscript $d$ indicates a value which is being applied to output register 114 in FIG. 10b, and the other subscripts and superscripts are as shown in FIG. 10b. Additionally, circuit 214 replaces each of the values on the left of each of the quality signs with the value on the right of that equality sign. If the answer at circuit 212 is no, circuit 216 performs the replacements that are indicated in the box for circuit 216. The notation used throughout the rest of FIGS. 12a–12g has the same meaning, and all signals identified by name in FIGS. 12a–12g refer either to contents of registers, flip-flops and memories in FIGS. 10a–10d or to the signals carried by lines in FIGS. 10a–10d. The names given to signals or storage locations in FIGS. 10a–10d and FIGS. 12a–12g correspond to each other. In FIGS. 12a–12g the subscript d identifies a signal which is being applied to the corresponding storage location. Subscripts $j$ and $k$ indicate that the signal is being applied to the $j$ or $k$ input of the identified flip-flop, and the Boolean logic expressions are written in the standard notation used in the art. In addition to the control signals generated and combined as indicated in FIGS. 12a–12g, the control gate network 189 in FIG. 10d generates the indicated output signal by combining the indicated input signals in accordance with the following logic expressions:

$TE = G5 + T2 + G6 + G30$; $ST = G8 + G9 + T1$; $L1 = G15 + G13$; $PX1 = G16 + G12$; $PL = (G14) + G11$; $NA = G10 + G17 + G5 + + G20 + G21 + BG_{+1}$; $PA = G18 + G19$; $RTA = G20 + G5 + G17 + BG_{+1}$; $ST = G9 + T1 + G8$; $RC = G19$; $DC = G21 + G18$; $IC = G10$; $I = G5 + G6 + G30$; $K_k = G13 + G15$; $K_j = G11 + G12$; $PND_k = G12 + G11$; $PND_j = G21$; $PAR_k = G20$; $PAR_j = G18$; $ILF_j = G25$; $\underline{ILF}_k = C3$; $PXWE_j = (G3 + A).DE$; $EWE_j = (A + G3.\overline{G4}) DE$.

Prior to this invention, graphics display systems of the type to which the invention pertains either generated a video raster for transmission to raster display terminals or generated stroke commands for transmission to stroke type terminals. As a result of this invention, a graphics display system can use fast, raster display terminals, as opposed to the slower stroke type terminal, and yet can transmit to the terminal not video raster, which requires expensive communication links, but edge definitions which require a relatively low transmission rate. As a result of this invention, a graphics display system is possible in which a single image generator drives a multiplicity of display terminals, each terminal being capable of displaying a complex color image without flicker. The particular novelty of a graphics display system in accordance with this invention resides in the visible edge encoder and in the combination of the visible edge encoder with display terminals of the invented type.

I claim:

1. A graphics display system for a display terminal having a display screen for visibly displaying selected points of a raster of display points arranged along regular scanlines, said system including a visible edge encoder comprising:

means for storing a set of edge intercept signals, each edge intercept signal comprising signals positioning a visible intercept point at a selected position along a selected scanline of the display screen and signals defining a plurality of selected visible characteristics of a portion of the same scanline which is adjacent the intercept point;

means responsive to said edge intercept signals in the storing means for generating a plurality of corresponding subsequent signals defining a block of visible edge signals, each visible edge signal comprising signals defining the position of a continuous visible edge along a line on the display screen which need not coincide with a scanline and signals defining selected visible characteristics of a selected two-dimensional portion of the display screen which is adjacent the continuous visible edge; and means for transmitting said block of generated visible edge signals to the display terminal, said terminal including means responsive to said generated visible edge signals for displaying the corresponding continuous visible edges and characteristics of the adjacent two-dimensional screen portions by a raster of visible display points along the scanlines of the display screen.

2. A graphics display system as in claim 1 wherein the generating means comprise:

means for testing the edge intercept signals according to the scanline order of the display screen and responsive to the testing of the first scanline which has edge intercept signals for generating visible edge signals of corresponding visible edges traversing the last recited scanline;

means responsive to the generation of visible edge signals of visible edges traversing said last recited scanline for comparing, according to the order of the subsequent scanlines the edge intercept signals of the current scanline with the visible edge signals of any visible edges traversing the previous scanline;

means responsive to a comparison by said comparing means indicating a selected spatial correspondence on said display screen between an edge intercept signal of the current scanline and a visible edge signal of the previous scanline for modifying the visible edge signal of the previous scanline by extending the corresponding visible edge through the current scanline; and means responsive to a comparison by said comparing means indicating the lack of a selected spatial correspondence between an edge intercept signal of the current scanline and any visible edge signals of visible edges traversing the previous scanline for generating a new visible edge signal corresponding to the last recited edge intercept signal.

3. A graphics display system as in claim 2 including means for storing the generated visible edge signals and for maintaining, during the comparison of the edge intercept signals from each current scanline, order signals indicating the order along the previous scanline of all visible edge signals of visible edges traversing said previous scanline.

4. A graphics display system as in claim 3 wherein the comparing means comprise:
- a first register for storing an edge intercept signal and a second register for storing a visible edge signal;
- means for storing in the first register an edge intercept signal of a current scanline;
- means responsive to the order signals for storing in the second register the first visible edge signal of the visible edges traversing the previous scanline;
- means responsive to the position signals of the visible edge signal stored in the second register to find the position along the current scanline at which an extension of the visible edge of the stored visible edge signal intersects the current scanline;
- means for comparing the positions along the current scanline of the position signals stored in the first register and of said extension intersection; and
- means responsive to the lack of a selected spatial correspondence between the compared positions to store the next visible edge signal in the second register and means responsive to the presence of a selected spatial correspondence between the two compared positions to cause said modifying of the visible edge signal stored in the second register.

5. A graphics display system as in claim 4 including means responsive to the comparing of the edge intercept signals of a selected scanline for transmitting to the display terminal the block of generated visible edges and for retaining in the storing means for visible edge signals only the visible edges signals corresponding to visible edges traversing the scanline previous to the last-recited selected scanline.

6. A graphics display system as in claim 1 including means for storing the generated visible edge signals and means responsive to the transmitting of the block of generated visible edge signals to the display terminal for retaining in the storing means for generated visible edge signals those visible edge signals which correspond to visible edges traversing the last of a selected sequence of scanlines on the display screen.

7. A method of operating a graphics display system for a display terminal having a display screen for visibly displaying selected points of a raster of display points arranged along regular scanlines comprising the steps of:
- storing a set of edge intercept signals in a first storing means, each edge intercept signal comprising signals positioning a visible intercept point at a selected position along a selected scanline of the display screen and signals defining a plurality of selected visible characteristics of a portion of the same scanline which is adjacent the visible intercept point;
- generating from said edge intercept signals in the storing means a block of visible edge signals, each visible edge signal comprising signals defining the position of corresponding subsequent signals defining a continuous visible edge along a line on the display screen which need not coincide with a scanline and signals defining a plurality of selected visible characteristics of a selected two-dimensional portion of the display screen which is adjacent the continuous visible edge; and
- transmitting said block of generated visible edge signals to the display terminal, said terminal responding to said generated visible edge signals to display the corresponding visible edges and characteristics of the adjacent two-dimensional screen portions by a raster of visible display points along the scanlines of the display screen.

8. A method of operating a graphics display system as in claim 7 wherein the generating step comprises:
- testing the edge intercept signals according to the scanline order of the display screen, and generating in response to the testing of the first scanline which has edge intercept signals visible edge signals of corresponding visible edges traversing the last recited scanline;
- in response to the generation of visible edge signals of visible edges traversing said last recited scanline, comparing by scanline, for each subsequent scanline, the edge intercept signals of the current scanline with the visible edge signals of any visible edges traversing the previous scanline;
- in response to a comparison indicating a selected spatial correspondence on said display screen between an edge intercept signal of the current scanline and a visible edge signal of the previous scanline, modifying the visible edge signal of the previous scanline by extending the corresponding visible edge through the current scanline; and
- in response to a comparison indicating the lack of a selected spatial correspondence between an edge intercept signal of the current scanline and any visible edge signals of visible edges traversing the previous scanline, generating a new visible edge signal corresponding to the last recited edge intercept signal.

* * * * *

UNITED STATES PATENT AND TRADEMARK OFFICE
CERTIFICATE OF CORRECTION

PATENT NO. : 3,944,997
DATED : March 16, 1976
INVENTOR(S) : Ronald J. Swallow

It is certified that error appears in the above-identified patent and that said Letters Patent are hereby corrected as shown below:

Column 1, line 46, "purposee", should read -- purpose --.

Column 2, line 33, "By", should read -- by --.

Column 6, line 11, insert a comma after "invention".

Column 7, line 9, delete "not", and insert -- now --.

Column 8, line 11, insert -- to -- after "then" first occurrence.

Column 9, line -, delete "flat" and insert -- flag --.

Column 9, line 62, insert a parenthesis ")" after "brightness".

Column 10, line 3, delete "$Y_{bm}$", and insert -- $y_{bm}$ --.

Column 12, line 62, delete "of", and insert -- in --.

Column 13, line 19, insert -- edge -- after "an".

Column 13, line 27, the expression "j + 1", should be the number "j + 1 (one)", not the letter "l".

Column 16, line 32, delete "is" third occurrence, and insert -- it --.

Column 19, line 48, delete a plus sign after "G5".

Signed and Sealed this

Seventeenth Day of August 1976

[SEAL]

Attest:

RUTH C. MASON
*Attesting Officer*

C. MARSHALL DANN
*Commissioner of Patents and Trademarks*